US007901293B2

(12) United States Patent
Oe

(10) Patent No.: US 7,901,293 B2
(45) Date of Patent: Mar. 8, 2011

(54) GAME SYSTEM, GAME APPARATUS, AND STORAGE MEDIUM HAVING GAME PROGRAM STORED THEREIN

(75) Inventor: Toru Oe, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 650 days.

(21) Appl. No.: 10/942,978

(22) Filed: Sep. 17, 2004

(65) Prior Publication Data

US 2005/0221897 A1 Oct. 6, 2005

(30) Foreign Application Priority Data

Mar. 22, 2004 (JP) ................................. 2004-083026

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................................ 463/42; 463/40
(58) Field of Classification Search .................... 463/39, 463/40, 42
See application file for complete search history.

(56) References Cited

U.S. PATENT DOCUMENTS

| | | | | |
|---|---|---|---|---|
| 5,396,225 | A | * | 3/1995 | Okada et al. ..................... 463/40 |
| 5,553,222 | A | * | 9/1996 | Milne et al. ................. 715/500.1 |
| 5,596,696 | A | * | 1/1997 | Tindell et al. .............. 715/500.1 |
| 5,618,045 | A | | 4/1997 | Kagan et al. |
| 5,775,996 | A | * | 7/1998 | Othmer et al. ................... 463/40 |
| 5,923,306 | A | * | 7/1999 | Smith et al. ..................... 345/2.2 |
| 6,126,548 | A | * | 10/2000 | Jacobs et al. .................... 463/42 |
| 6,183,367 | B1 | * | 2/2001 | Kaji et al. ........................ 463/42 |
| 6,315,668 | B1 | | 11/2001 | Metke et al. |
| 6,346,048 | B1 | | 2/2002 | Ogawa et al. |
| 6,361,440 | B1 | | 3/2002 | Ogawa et al. |
| 6,947,761 | B2 | * | 9/2005 | Hutcheson et al. ........... 455/518 |
| 2002/0129169 | A1 | | 9/2002 | Tanaka et al. |
| 2003/0130040 | A1 | | 7/2003 | Dripps |
| 2004/0029638 | A1 | | 2/2004 | Hytcheson et al. |
| 2004/0087371 | A1 | | 5/2004 | Yamana et al. |
| 2004/0087372 | A1 | | 5/2004 | Yamana et al. |

FOREIGN PATENT DOCUMENTS

| | | |
|---|---|---|
| JP | 8-243255 | 9/1996 |
| JP | 2000-107453 | 4/2000 |
| JP | 2000-288256 | 10/2000 |
| JP | 2002-271307 | 9/2002 |

OTHER PUBLICATIONS

Notice of Reasons for Rejection issued on Jul. 28, 2008 in corresponding Japanese Application No. 2004-083026.

* cited by examiner

*Primary Examiner* — Dmitry Suhol
*Assistant Examiner* — Kevin Y Kim
(74) *Attorney, Agent, or Firm* — Nixon & Vanderhye P.C.

(57) ABSTRACT

In a game system of the illustrative embodiments, a slave machine a process of lengthening a frame cycle at times k1 and k2 by a time period of j1 and a time period of j2, respectively, thereby establishing synchronization with a master machine. Also, the master machine carries out a process of lengthening the frame cycle thereof by a time period of i at time h1 to deliberately cause the frame cycle to tend to be slower than the frame cycle of the slave machine, thereby causing the slave machine to adjust the frame cycle thereof so as to be lengthened by a time period of j3 at time k3. Accordingly, it is possible to secure a minimum length of the process cycle with consideration of an individual difference between game apparatuses

16 Claims, 10 Drawing Sheets

GAME SYSTEM, GAME APPARATUS, AND STORAGE MEDIUM HAVING GAME PROGRAM STORED THEREIN

BACKGROUND AND SUMMARY OF THE INVENTION

1. Field of the Invention

The illustrative embodiments relate to a game system in which communication is carried out between a plurality of game apparatuses, the game apparatuses, and a storage medium having a game program stored therein. More particularly, the illustrative embodiments relate to a game system in which communication capability is used to allow a plurality of players to implement a game, game apparatuses, and a storage medium having a game program stored therein.

2. Description of the Background Art

Conventionally, there have been game systems in which a game progresses by using wired communication, in which a plurality of game apparatuses are connected by communication lines, or by using short-range wireless communication. For example, in game systems disclosed in Japanese Laid-Open Patent Publication No. 8-243255 and Japanese Laid-Open Patent Publication No. 2000-107453, a multiplayer game is played between a plurality of game apparatuses using a network, and the game apparatuses are synchronized with respect to processing time so as to share game progression therebetween. In the game systems as described above, since the game apparatuses are in synchronization with respect to processing time, it is possible to prevent chronological information from being processed in unchronological order. For example, process progression in each game apparatus is based on the operating clock of the game apparatus, and a slight difference in operating clock might exist between the game apparatuses, due to individual apparatus difference, even though the game apparatuses operate at the same frequency. The difference in operating clocks is gradually increased with the process progression, hindering the process in the game apparatuses.

In a game machine control device system disclosed in Japanese Laid-Open Patent Publication No. 8-243255, a reset command is transmitted from a master machine to a slave machine. Then the slave machine, having received the reset command, resets a synchronization counter responsible for a game control cycle based on the reset command. In a game system disclosed in Japanese Laid-Open Patent Publication No. 2000-107453, reproduction timing of the game apparatus is adjusted such that game data distributed from a game data distribution device is reproduced when the game data is invisible to the game player.

In the game machine control device system disclosed in Japanese Laid-Open Patent Publication No. 8-243255, however, the slave machine, having received the reset command from the master machine, resets the synchronization counter. As a result a control cycle length when reset occurs is naturally shortened in the slave machine. Accordingly, if the slave machine receives the reset command from the master machine, it is difficult to secure the time required for a game process in the slave machine.

Also, in the game system disclosed in Japanese Laid-Open Patent Publication No. 2000-107453, each game apparatus has limited opportunity to adjust the time to switch from a still image to a moving image, the time to switch from a moving image to a still image, and the time to reproduce a flash scene, so that synchronization in processing time cannot always be established.

Therefore, a feature of the illustrative embodiments is to provide a game system, game apparatuses, and a storage medium having a game program stored therein, which are capable of securing the time required for a game process in the game apparatuses, while suitably adjusting synchronization in processing time between the game apparatuses.

The illustrative embodiments have the following features to attain the feature mentioned above. It should be noted that reference numerals and supplemental remarks in parentheses merely indicate correspondence with a preferred embodiment which will be described further below for the purpose of better understanding of the present invention, and do not restrict the scope of the present invention.

A first aspect of the illustrative embodiments is directed to a game system comprising a first game apparatus (a game apparatus 1a) and a second game apparatus (a game apparatus 1b or 1c) which carry out a game process for each process cycle having a predetermined length, in which the first and second game apparatuses communicate with each other for multiplayer game play. The first game apparatus includes a first timing information acquisition section (S38) and a first timing information transmission control section (S39). The first timing information acquisition section acquires first timing information (master V_TSF value), which indicates a first time (a master TSF value when V_COUNT value=0) with respect to a predetermined reference time (the beginning of a frame) in the process cycle of the first game apparatus, based on the process cycle. The first timing information transmission control section transmits the first timing information (a beacon) to the second game apparatus. The second game apparatus includes a first timing information reception control section (S54-S56), a second timing information acquisition section (S60), a detection section (S61), and a first cycle change section (S62-S65, S68-S71). The first timing information reception control section receives the first timing information from the first game apparatus. The second timing information acquisition section acquires second timing information (a slave V_TSF value), which indicates a second time (a slave TSF value when V_COUNT value=0) with respect to a predetermined reference time in the process cycle of the second game apparatus, based on the process cycle. The detection section detects a difference between the predetermined reference time of the second game apparatus and the predetermined reference time of the first game apparatus, based on the second timing information and the first timing information received by the first timing information reception control section. The first cycle change section temporarily lengthens the process cycle of the second game apparatus (V_COUNT-L) if the detection section detects the difference, and the difference detected by the detection section is equal to or more than a predetermined value (Lt).

Here, the process cycle may be temporarily lengthened until the difference between the predetermined reference time of the second game apparatus and the predetermined reference time of the first game apparatus becomes less than or equal to a predetermined value. Alternatively, only a predetermined number of process cycles (e.g., one process cycle) may be temporarily lengthened. For example, if the detection section detects the difference or if the difference detected by the detection section is equal to or more than the predetermined value, only the process cycle in which the detection occurs may be lengthened. That is, if the detection section detects the difference or if the difference detected by the detection section is equal to or more than the predetermined value, the first cycle change section lengthens the process cycle of the second game apparatus. Thereafter, if a predetermined condition is satisfied, the process cycle is brought back to a predetermined length (the original length). Also, the detection section may detect whether the predetermined reference time of the second game apparatus agrees with the predetermined reference time of the first game apparatus. If there is no agreement therebetween, the detection section may determine the degree (the length) by which the first cycle change section lengthens the process cycle.

Alternatively, the detection section may detect the difference between the predetermined reference time of the second game apparatus and the predetermined reference time of the first game apparatus based on a time indicated by the first timing information and a time indicated by the second timing information, or, as will be described later in conjunction with a second aspect of the illustrative embodiments, the time indicated by the first timing information is added to the length of the process cycle (a cycle period) until the time indicated by the first timing information becomes later than the time indicated by the second timing information. Thereafter, a difference between the time indicating the first timing and the time indicating the second timing may be detected as the difference between the predetermined reference times.

In the second aspect, if a time indicating the first time is earlier than a time indicating the second time, the detection section adds a predetermined length of the process cycle to the time indicating the first time, until the time indicating the first time becomes later than the time indicating the second time, and thereafter the detection section detects a difference between the time indicating the first time and the time indicating the second time as the difference between the predetermined reference times.

In a third aspect, each of the first and second game apparatuses further includes a counter (131) and a game process section. The counter is operable to automatically update a count value (a V_COUNT value) and to count values within a predetermined range (0-262). The game process section carries out a game process in rounds of values counted by the counter, each round corresponding to one process cycle. The first cycle change section decreases the count value of the counter (V_COUNT-L), thereby lengthening the process cycle.

In a fourth aspect, each of the first and second game apparatuses further includes a display control section (13). The display control section designates a display position based on the count value of the counter, and updates a screen display corresponding to the display position. The process cycle is divided, based on the count value of the counter, into a display period (0-191) in which the screen display is updated and a blanking period (192-262) in which the screen display is not updated. If the counter indicates a count value (212) corresponding to the blanking period, the first cycle change section decreases the count value.

In a fifth aspect, the first cycle change section decreases the count value of the counter so as to remain indicative of the blanking period.

In a sixth aspect, the first timing information acquisition section acquires the first timing information at regular intervals (500 ms intervals). Upon acquisition of the first timing information, the first timing information transmission control section transmits the first timing information to the second game apparatus. Upon reception of the first timing information, the second timing information acquisition section acquires the second timing information. Upon acquisition of the second timing information, the detection section detects the difference between the predetermined reference time of the second game apparatus and the predetermined reference time of the first game apparatus based on the second timing information and the first timing information.

In a seventh aspect, each of the first and second game apparatuses further includes a clocking section (33) and a clock synchronization section (S39, S56). The clocking section measures time and generates a clock value (a TSF value). The clock synchronization section establishes synchronization in the clock value with another game apparatus. The first timing information acquisition section acquires, as the first timing information (a master V_TSF value), the clock value (a master TSF value) generated at the first time (V_COUNT=0) by the clocking section of the first game apparatus. The second timing information acquisition section acquires, as the second timing information (a slave V_TSF value), the clock value (a slave TSF value) generated at the second time (V_COUNT=0) by the clocking section of the second game apparatus.

In an eighth aspect, the first game apparatus further includes a second cycle change section (S32-S36). The second cycle change section temporarily lengthens the process cycle of the first game apparatus with a predetermined timing (S35). The second cycle change section may temporarily lengthen the process cycle of the first game apparatus at regular time intervals (the number n of frames). Alternatively, if a predetermined condition is satisfied (for example, the predetermined reference time of the first game apparatus becomes earlier than the predetermined reference time of the second game apparatus), the process cycle of the first game apparatus may be temporarily lengthened. In this case, there may be a means for notifying the first game apparatus from the second game apparatus, that the predetermined reference time of the first game apparatus has become earlier than the predetermined reference time of the second game apparatus. Here, only a predetermined number of process cycles (e.g., one process cycle) may be temporarily lengthened, or the process cycle may be temporarily lengthened until a predetermined condition is satisfied (for example, until the predetermined reference time of the first game apparatus agrees with or becomes later than the predetermined reference time of the second game apparatus).

In a ninth aspect, the predetermined timing, with which the second cycle change section temporarily lengthens the process cycle of the first game apparatus, is set based on an assumed individual difference (ppm) in the process cycle between the first and second game apparatuses.

In a tenth aspect, the first timing information transmission control section broadcasts the first timing information.

In an eleventh aspect, the second game apparatus further includes a synchronization establishment information transmission control section (S22,S66). The synchronization establishment information transmission control section transmits synchronization establishment information, which indicates that synchronization with the first game apparatus has been established (a synchronization OK flag is "1"), to the first game apparatus if the difference detected by the detection section is less than a predetermined value. The first game apparatus further includes a synchronization establishment information reception control section (S13) and a game process start section (S15). The synchronization establishment information reception control section receives the synchronization establishment information transmitted from the second game apparatus. In response to the synchronization establishment information received by the synchronization establishment information reception control section, the game process start section starts a multiplayer game process with the second game apparatus.

A twelfth aspect of the illustrative embodiments is directed to a game apparatus (a game apparatus 1b or 1c) for communicating with an additional game apparatus (a game apparatus 1a) for multiplayer game play, where the game apparatus and the additional game apparatus carry out a game process for each process cycle having a predetermined length. The additional game apparatus transmits, based on the process cycle thereof, first timing information which indicates a first time with respect to a predetermined reference time in the process cycle. The game apparatus includes a first timing information reception control section, a second timing information acquisition section, a detection section, and a cycle change section (S62-S65,S68-S71). The first timing information reception control section receives the first timing information from the additional game apparatus. The second timing information acquisition section acquires second timing information, which indicates a second time with respect to the predetermined reference time in the process cycle of the game apparatus, based on the process cycle. The detection section detects a difference between the predetermined reference time of the game apparatus and the predetermined reference time of the additional game apparatus, based on the second timing information and the first timing information received by the first timing information reception control section. The cycle change section temporarily lengthens the process cycle of the game apparatus if the detection section detects the difference or if the difference detected by the detection section is equal to or more than a predetermined value.

A thirteenth aspect of the illustrative embodiments is directed to a game apparatus (a game apparatus 1a) for communicating with an additional game apparatus (a game apparatus 1b or 1c) for multiplayer game play, where the game apparatus and the additional game apparatus carry out a game process for each process cycle having a predetermined length. The game apparatus includes a timing information acquisition section (S38), a timing information transmission control section (S39), and a cycle change section (S32-S36). The timing information acquisition section acquires timing information (a master V_TSF value), which indicates a time (a master TSF value when V_COUNT value=0) with respect to the predetermined reference time in the process cycle of the game apparatus, based on the process cycle. The timing information transmission control section regularly transmits the timing information to the additional game apparatus. The cycle change section temporarily lengthens the process cycle of the game apparatus with a predetermined timing (the number n of frames) (S35).

A fourteenth aspect of the illustrative embodiments is directed to a storage medium having stored therein a game program to be executed by a computer (11) of a game apparatus (a game apparatus 1b or 1c) communicating with an additional game apparatus (a game apparatus 1a) for multiplayer game play, where the game apparatus and the additional game apparatus carry out the game process for each process cycle having the predetermined length. The additional game apparatus transmits, based on the process cycle thereof, first timing information which indicates a first time with respect to the predetermined reference time in the process cycle. The game program stored in the storage medium causes the computer to function as: a first timing information reception control section; a second timing information acquisition section; a detection section; and a cycle change section (S62-S65,S68-S71). The first timing information reception control section receives the first timing information from the additional game apparatus. The second timing information acquisition section acquires second timing information, which indicates a second time with respect to the predetermined reference time in the process cycle of the game apparatus, based on the process cycle. The detection section detects a difference between the predetermined reference time of the game apparatus and the predetermined reference time of the additional game apparatus, based on the second timing information and the first timing information received by the first timing information reception control section. The cycle change section temporarily lengthens the process cycle of the game apparatus if the detection section detects the difference or if the difference detected by the detection section is equal to or more than a predetermined value.

A fifteenth aspect of the illustrative embodiments is directed to a storage medium having stored therein a game program to be executed by a computer of a game apparatus (a game apparatus 1b or 1c) for communicating with an additional game apparatus (a game apparatus 1a) for multiplayer game play, the game apparatus and the additional game apparatus carry out a game process for each process cycle having a predetermined length. The game program stored in the storage medium causes the computer to function as: a timing information acquisition section (S38); a timing information transmission control section (S39); and a cycle change section (S32-S36). The timing information acquisition section acquires timing information (a master V_TSF value), which indicates a time (a master TSF value when V_COUNT value=0) with respect to the predetermined reference time in the process cycle of the game apparatus, based on the process cycle. The timing information transmission control section regularly transmits the timing information to the additional game apparatus. The cycle change section temporarily lengthens the process cycle of the game apparatus with a predetermined timing (the number n of frames) (S35).

A sixteenth aspect of the illustrative embodiments is directed to a storage medium having stored therein a game program to be executed by computers of a plurality of game apparatuses for communicating with each other for multiplayer game play, the plurality of game apparatuses each being set either as a master machine or as a slave machine and carrying out a game process for each process cycle having a predetermined length. The game program stored in the storage medium causes a computer of a game apparatus to function as a master/slave setting section (for example, the first game apparatus 1 to have attempted radio communication may be set as the master machine). The master/slave setting section sets the game apparatus either as the master machine or as the slave machine based on a predetermined condition. If the master/slave setting section sets the game apparatus as the master machine, the game program stored in the storage medium causes the computer of the game apparatus to function as: a first timing information acquisition section; a first timing information transmission control section; and a first cycle change section (S32-S36). The first timing information acquisition section acquires first timing information, which indicates a first time, with respect to a predetermined reference time in the process cycle of the game apparatus, based on the process cycle. The first timing information transmission control section transmits the first timing information to an additional game apparatus being set as the slave machine. The first cycle change section temporarily lengthens the process cycle of the game apparatus with a predetermined timing. If the master/slave setting section sets the game apparatus as the slave machine, the game program causes the computer of the game apparatus to function as: a first timing information reception control section; a second timing information acquisition section; a detection section; and a second cycle change section (S62-S65,S68-S71). The first timing information reception control section receives the first timing information from an additional game apparatus having been set as the master machine. The second timing information acquisition section acquires second timing information, which indicates a second time with respect to a predetermined reference time in the process cycle of the game apparatus, based on the process cycle. The detection section detects a difference between the predetermined reference time of the game apparatus and the predetermined reference time of the additional game apparatus being set as the master machine, based on the second timing information and the first timing information received by the first timing information reception control section. The second cycle change section temporarily lengthens the process cycle of the game apparatus if the detection section detects the difference or if the difference detected by the detection section is equal to or more than a predetermined value.

According to the first aspect, the second game apparatus lengthens the process cycle thereof, thereby carrying out a synchronization process with the first game apparatus. Accordingly, it is possible to secure a satisfactory process time in each process cycle, while maintaining synchronization in processing with the first game apparatus.

According to the second aspect, even if there is a time lag between acquisition of the first time by the first timing information acquisition section and acquisition of the second time by the second timing information acquisition section, it is possible to detect a difference between corresponding process reference times with consideration of the time lag.

According to the third aspect, the use of a counter function for use in display control makes is possible for the first and second game apparatuses to efficiently establish synchronization with each other.

In the fourth and fifth aspects, the cycle of the second game apparatus is changed in the blanking period, and an adjusted count value is updated so as to agree with a count value in the blanking period. Accordingly, it is possible to establish synchronization in processing between the game apparatuses without corrupting a screen display on the second game apparatus.

According to the sixth aspect, the first timing information is regularly transmitted from the first game apparatus to the second game apparatus, and therefore it is possible to regularly carry out synchronization adjustment in an appropriate manner. Also, even if asynchrony in processing occurs between the game apparatuses, it is possible to carry out the synchronization adjustment immediately.

According to the seventh aspect, clock values referenced to by the first and second game apparatuses are in synchronization with each other, and timings of the process cycles are estimated based on the clock values, whereby it is possible to accurately detect asynchrony between the process cycles.

According to the eighth aspect, the first game apparatus carries out a process of deliberately causing the frame cycle thereof to tend to be slower than the frame cycle of the slave machine, thereby causing the slave machine to adjust its own frame cycle so as to be lengthened. As a result, in all game apparatuses, timing of the process cycle is adjusted so as to lengthen the process cycle, and therefore it is possible to secure a minimum length of the process cycle and to stably carry out synchronization adjustment.

According to the ninth aspect, it is possible to secure the minimum length of the process cycle with consideration of individual differences between the game apparatuses, and to stably carry out synchronization adjustment.

According to the tenth aspect, the first game apparatus broadcasts the first timing information, and the second game apparatus receives and uses the first timing information to carry out a synchronization process. Accordingly, even in the case where the first game apparatus communicates with a plurality of second game apparatuses, it is possible to adjust synchronization among all game apparatuses without transmitting the first timing information separately.

According to the eleventh aspect, the game starts after the first game apparatus confirms synchronization with the second game apparatus, and therefore it is possible to reduce process errors due to asynchrony.

Also, a game apparatus according to the illustrative embodiments achieves an effect similar to that achieved by the first game apparatus or the second game apparatus included in the game system as described above. Also, a computer of a game apparatus included in the game system as described above is caused to execute a game program stored in a storage medium according to the illustrative embodiments, thereby achieving an effect similar to that achieved by the game system.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flowchart showing a synchronization process performed by the master game apparatus 1a;

DESCRIPTION OF THE PREFERRED EMBODIMENTS

Figure 1:
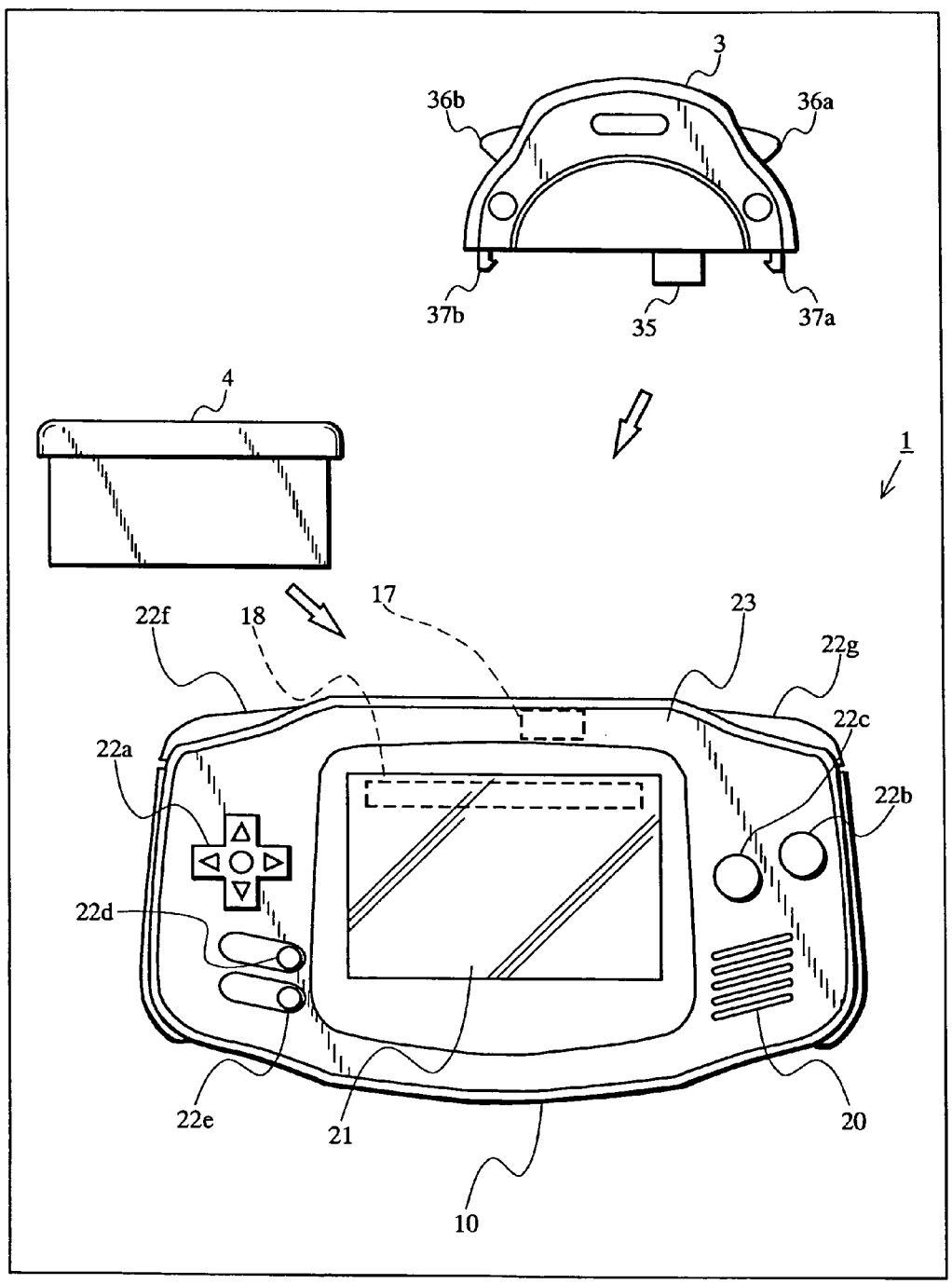
FIG. 1 is an external view of a game apparatus 1 included in a game system according to an embodiment of the present invention.

Referring to the drawings, a structure of a portable game apparatus 1 included in a game system according to an embodiment of the present invention is described. FIG. 1 is an external view of the portable game apparatus 1 included in the game system. Note that a component of the game system of the present invention is not limited to the portable game apparatus 1, and the present invention is also applicable to a non-portable game apparatus. Although the following descriptions are given with respect to an exemplary case where communication between a plurality of game apparatuses 1 is carried out by means of short-range radio communication, wired communication may be performed by connecting the game apparatuses 1 together with a communication cable or the like. Alternatively, communication may be carried out by connecting the game apparatuses 1 together to form a wide-area network which causes substantially no delays.

In FIG. 1, the game apparatus 1 is structured by a game apparatus body 10 to which a game cartridge 4 (hereinafter, simply referred to as a "cartridge 4") and a radio communication unit 3 are attached. The cartridge 4 is used as a medium for storing information such as a game program, etc. If the cartridge 4 is loaded from the back of the game apparatus body 10, a semiconductor memory, etc., (a ROM 41 and a backup RAM 42 shown in FIG. 2) contained in the cartridge 4 and the game apparatus body 10 are electrically connected together. Provided in an upper portion of the back of the game apparatus body 10 is a cartridge insertion slit (not shown) for removably loading the cartridge 4, and provided in the vicinity of the bottom behind the loading slit is a connector 18 (an area enclosed by broken lines in FIG. 1) to which the cartridge 4 is electrically connected. A radio communication unit 3 is operable to carry out radio communication with other game apparatuses. The radio communication unit 3 is attached to the back of the game apparatus body 10 in order to output received communication data to the game apparatus body 10 and transmit communication data outputted from the game apparatus body 10 to other game apparatuses. Provided on a lower portion of the back of the game apparatus body 10 is a connector 17 (an area enclosed by broken lines in FIG. 1) for electrically connecting with a connector 35 of the radio communication unit 3.

The game apparatus body 10 includes a housing 23 which has a liquid crystal display (LCD) 21 formed in a central portion of a primary surface (as shown in FIG. 1). The game apparatus body 10 includes a loudspeaker 20 and operating switches 22a-22g which are provided in areas outside the LCD 21 or side surfaces of the housing 23. The operating switches 22a-22g provide different operating instructions depending on game programs processed by the game apparatus 1. Typically, the operating switch (cross-key pad) 22a provides an instruction about movement directions, the operating switches 22b and 22c provide action instructions such as "A" and "B", the operating switches 22d and 22e provide action instructions such as "START" and "SELECT", and the operating switches 22f and 22g provide action instructions such as "L" and "R".

The radio communication unit 3 includes the connector 35 provided in a lower portion thereof, a pair of protrusion members 36a and 36b provided in an upper portion thereof, and a pair of engaging members 37a and 37b provided in the lower portion similar to the connector 35. The protrusion members 36a and 36b respectively protrude from right and left sides of the upper portion of the radio communication unit 3. If the player depresses the protrusion members 36a and 36b so as to move from the outside inward, each of the engaging members 37a and 37b protruding in the lower portion moves outward. Then, if the player stops operating the protrusion members 36a and 36b, the protrusion members 36a and 36b are both biased outward, and therefore each of the engaging members 37a and 37b moves inward. The game apparatus body 10 has engaging holes (not shown) formed so as to be engaged with the engaging members 37a and 37b, respectively. The player connects the connector 35 of the radio communication unit 3 with the connector 17 of the game apparatus body 10, and simultaneously engages the engaging members 37a and 37b with their respective engaging holes, thereby attaching the radio communication unit 3 to the game apparatus body 10. Also, an antenna for allowing the radio communication unit 3 to communicate with other game apparatuses by radio is provided on a substrate within the housing so as not to be exposed to the outside of the housing. In the present embodiment, the radio communication unit 3 performs communication based on wireless LAN IEEE 802.11 standards.

Figure 2:
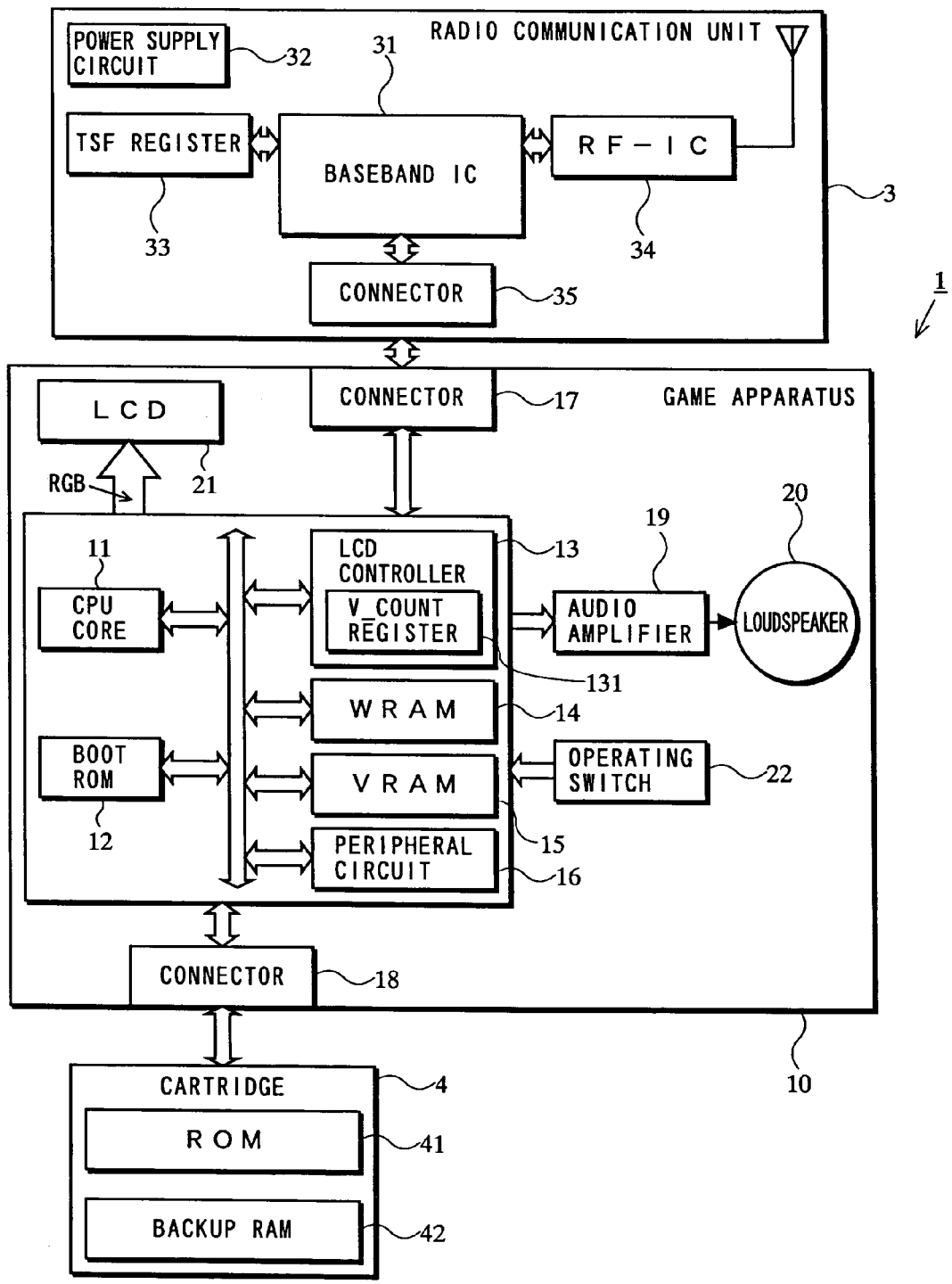
FIG. 2 is a functional block diagram of the game apparatus 1 shown in FIG. 1.

FIG. 2 is a functional block diagram of the game apparatus 1 including the game apparatus body 10, the cartridge 4, and the radio communication unit 3. In FIG. 2, in addition to components as described above, the game apparatus body 10 includes a central processing unit (CPU core) 11, a boot ROM 12, an LCD controller 13, a working RAM (WRAM) 14, a video RAM (VRAM) 15, a peripheral circuit 16, and an audio amplifier 19. Also, in addition to components as described above, the radio communication unit 3 includes a baseband IC 31, a power supply circuit 32, a timing synchronization function (TSF based on IEEE802.11) register 33, and a Radio Frequency-IC (RF-IC) 34. Also, in addition to the above elements, the cartridge 4 includes the ROM 41 and the backup RAM 42.

The ROM 41 has stored therein a game program which describes the details of a game played with the game apparatus 1, and image and audio data for use in the game. The CPU core 11 operates in a game process mode based on the game program stored in the ROM 41. The CPU core 11 is connected to components via a predetermined bus and further to the connectors 17 and 18. Data input through the connectors 17 and 18 is passed to the CPU core 11. Also, data processed by the CPU core 11 can be output to the connectors 17 and 18.

The CPU core 11 is operable to process a boot-up program stored in the boot ROM 12, and operates in a game process mode based on the game program stored in the ROM 41. When the cartridge 4 is loaded in the game apparatus body 10, the CPU core 11 accesses the ROM 41 via the connector 18. Also, the CPU core 11 executes a game process based on the game program and an operating signal input by operating the operating switch 22, stores data into the WRAM 14 during data processing, and temporarily stores image data into the VRAM 15.

When the CPU core 11 operates in the game process mode, a game program, process data, and data for performing radio communication in synchronization with another game apparatus are stored into the WRAM 14. The WRAM 14 is suitably used as a memory region required for processes performed by the CPU core 11. Also, when the game apparatus 1 performs radio communication with another game apparatus, data stored in the WRAM 14 is suitably output through the connector 17 to the radio communication unit 3 in accordance with an instruction from the CPU core 11. Also, received data obtained from another game apparatus via the radio communication unit 3 is processed by the CPU core 11 and suitably stored into the WRAM 14.

The audio amplifier 19 includes a D/A conversion circuit and an amplification circuit. Accordingly, the audio amplifier 19 is operable to convert audio data, which is associated with a result of processing the game program by the CPU core 11, into an audio signal (an analog signal), and the audio signal is suitably amplified and output as audio and effect sound from the loudspeaker 20.

The CPU core 11 performs image processing using memory regions of the WRAM 14 and the VRAM 15. The CPU core 11 generates game image data to be displayed on the LCD 21 using the memory regions, and stores the generated data into the VRAM 15. The LCD controller 13 performs display control so that the image data stored in the VRAM 15 is displayed on the LCD 21. The VRAM 15 temporarily stores the image data processed by the CPU core 11. Also, LCD controller 13 includes a V_COUNT register 131. The V_COUNT register 131 is a counter for designating, for each scanning line of the LCD 21, a display line number on which the image data stored in the VRAM 15 is displayed by the LCD controller 13, and a count is updated with predetermined clock timing. Specifically, a count value indicated by the V_COUNT register 131 (hereinafter, referred to as a "V_COUNT value) indicates a display line number on the LCD 21, and the CPU core 11 reads the V_COUNT register 131 to acquire the display line number. Also, the CPU core 11 is able to set the count value of the V_COUNT register 131 so as to change the display line number to be scanned by the LCD controller 13.

The peripheral circuit 16 is operable to perform audio processing, direct memory access (DMA), timer control, input/output control, etc.

The ROM 41 of the cartridge 4 has permanently stored therein a game program, various data for use with the game program, and data for use in radio communication. Game data obtained by executing the game program is stored via the connector 18 into the backup RAM 42 in a rewritable and nonvolatile manner. Examples of the game data stored in the backup RAM 42 include backup data indicating the progression of the game at the time of quitting. Note that the backup RAM 42 may be formed by a flash memory, etc.

The baseband IC 31 of the radio communication unit 3 receives data to be transmitted, from the game apparatus body 10 via the connectors 17 and 35, and encodes the data before transmitting it to the RF-IC 34. The RF-IC 34 modulates the data transmitted from the baseband IC 31, and transmits the modulated data by radio waves from the antenna. Also, radio waves transmitted from another game apparatus are received via the antenna, and demodulated into a demodulation signal by the RF-IC 34. Then, the demodulation signal is outputted to the baseband IC 31. The baseband IC 31 decodes the demodulation signal to generate data, and transfers the obtained data to the game apparatus body 10 via the connectors 35 and 17. The TSF register 33 is a counter for establishing process synchronization by, for example, exchanging data between a plurality of game apparatuses 1. At the same time, the TSF register 33 operates as a clocking means based on predetermined operating clock. For example, the TSF register 33 employs a timing synchronization function for use in radio communication and in conformity with wireless LAN IEEE 802.11 standards. In the present embodiment, the CPU core 11 reads a value of the TSF register 33 (hereinafter, referred to as a "TSF value") via the connectors 17 and 35, thereby acquiring a momentary TSF value (in units of microsecond (μ's)). The power supply circuit 32 is operable to supply power to each component of the radio communication unit 3. Note that in the present embodiment, radio communication is carried out by short-range radio using weak radio waves.

Figure 3:
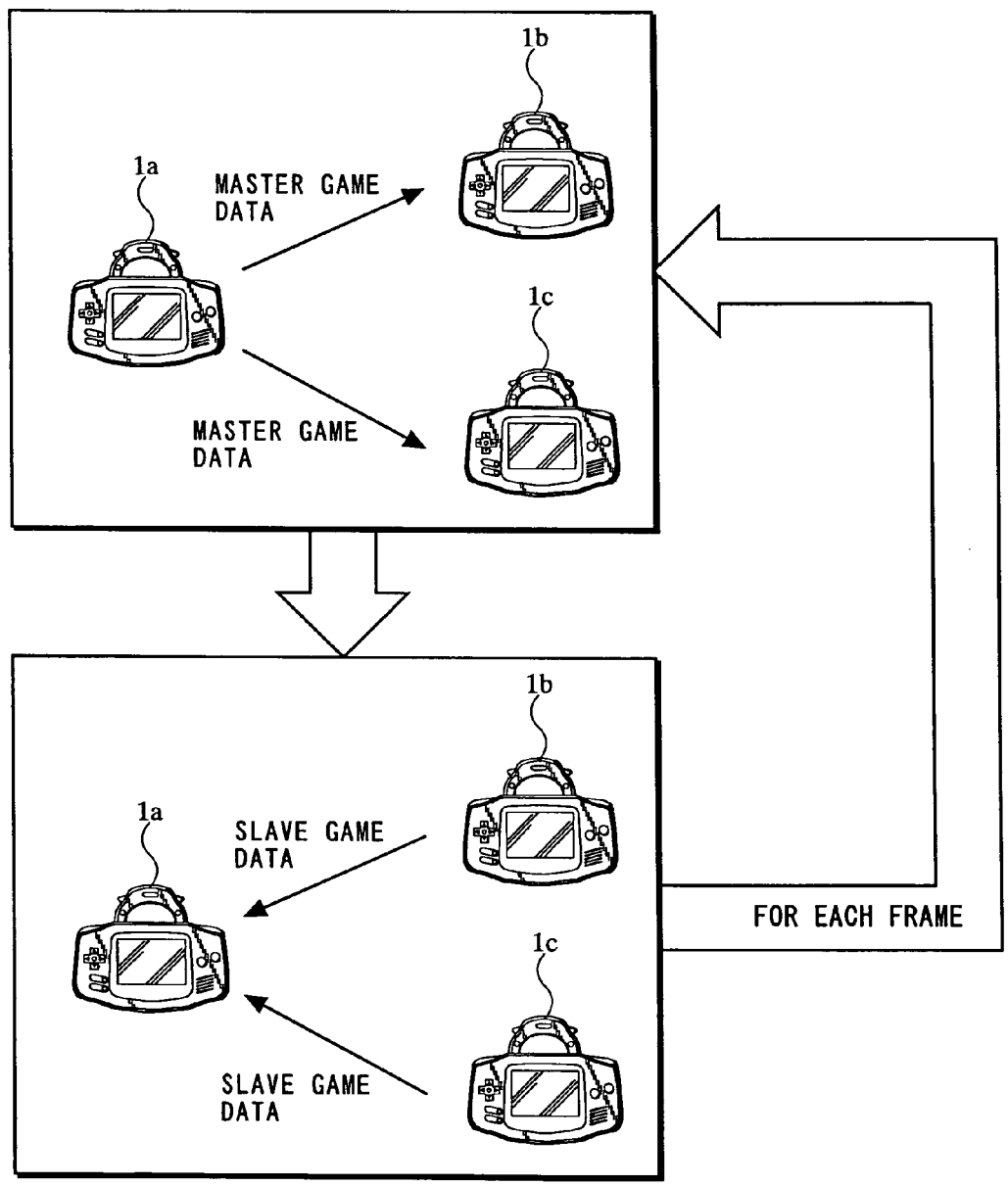
FIG. 3 is a diagram used for explaining how game data is exchanged between a plurality of game apparatuses 1.
Figure 4:
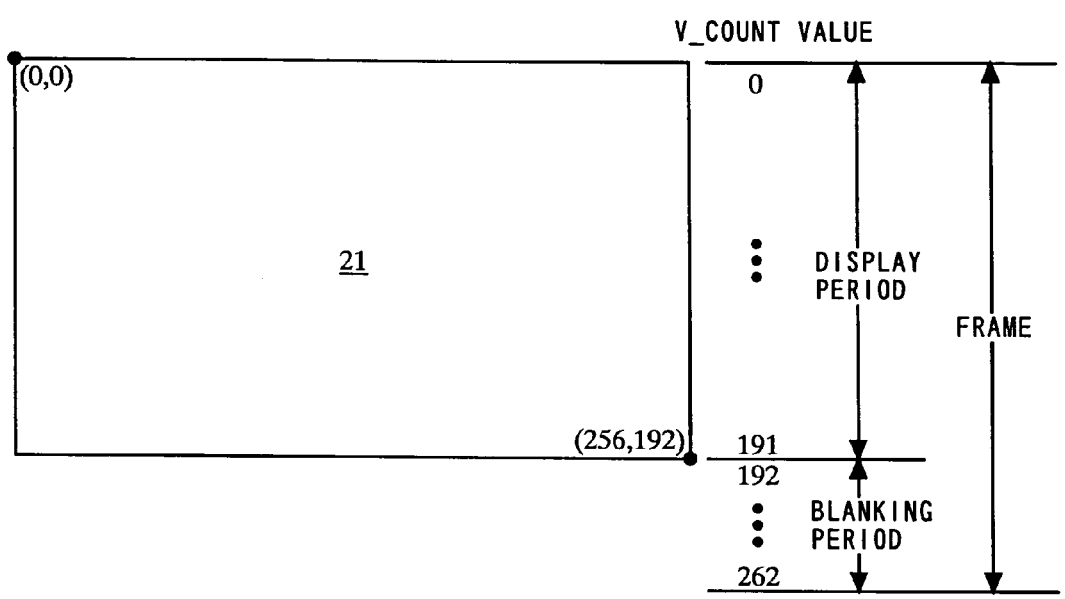
FIG. 4 is a diagram used for explaining relationships between V_COUNT values, scanning lines on the LCD 21, and a frame.
Figure 5:
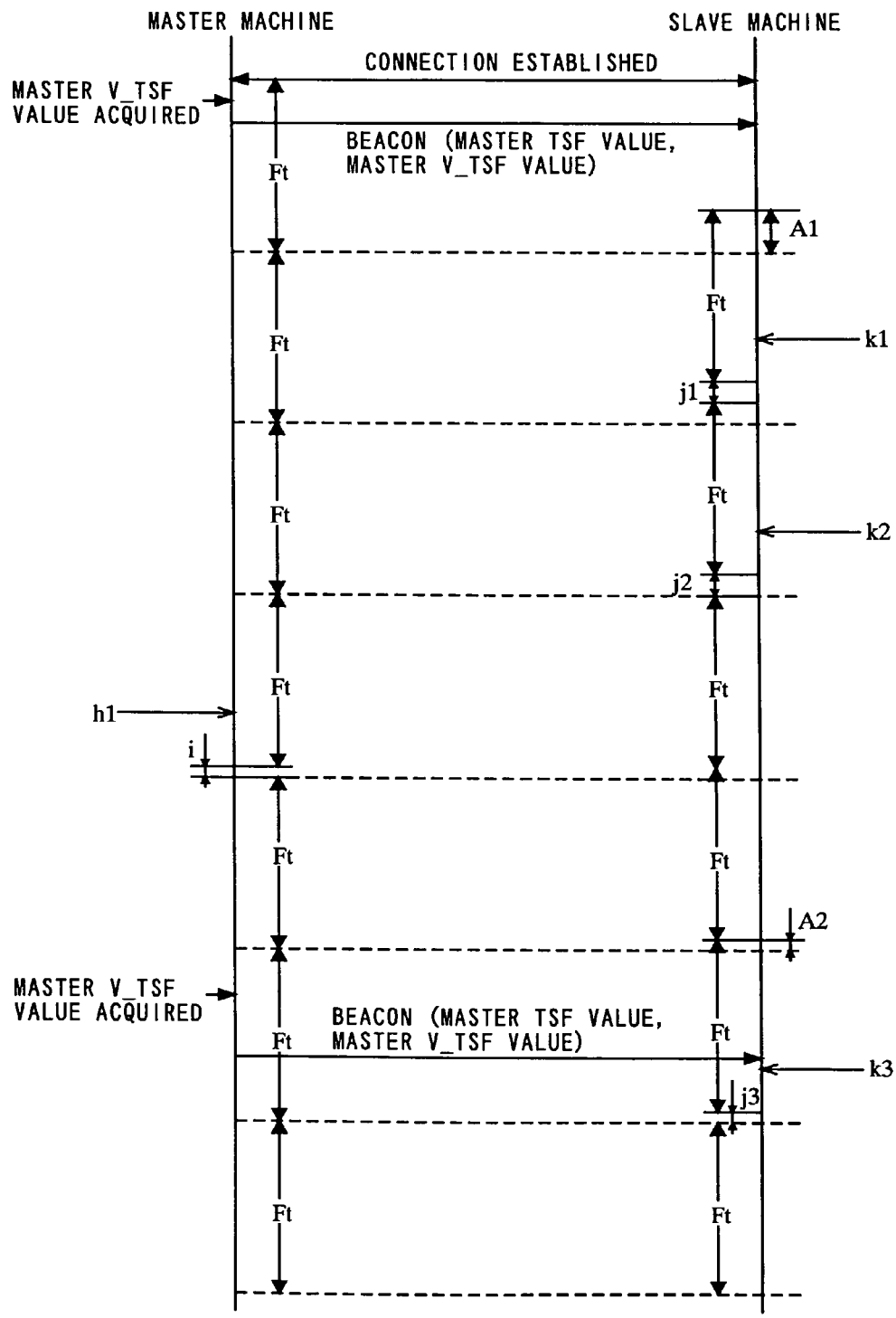
FIG. 5 is a diagram used for explaining the procedure of establishing synchronization between a master game apparatus 1a and a slave game apparatus 1b.

Next, before describing an example of a data map of the present embodiment and a flowchart of the game process executed by the game apparatus 1, the outline of a communication synchronization process performed by the game apparatus 1 executing the game program is described for better understanding of the illustrative embodiments in conjunction with the entire operation of the game system and with reference to FIGS. 3-5. Note that FIG. 3 is a diagram used for explaining how game data is exchanged between a plurality of game apparatuses 1, FIG. 4 is a diagram used for explaining relationships between V_COUNT values, scanning lines on the LCD 21, and a frame, and FIG. 5 is a diagram used for explaining the procedure of establishing synchronization between a master game apparatus 1a and a slave game apparatus 1b.

FIG. 3 shows an exemplary game system in which a game progresses via radio communication among three game apparatuses 1. In the present embodiment, of all game apparatuses 1 included in the game system, one game apparatus 1 is set as a master machine, and all the other game apparatuses 1 are set as slave machines. Note that in determination of the master machine and the slave machines, the first game apparatus 1 to have attempted radio communication may be set as the master machine, or the master machine may be set in an arbitrary manner, for example, by operating the operating switch 22. In the present embodiment, any game apparatus 1 included in the game system can be set as either the master machine or the slave machine. In the following descriptions, where the master machine and the slave machines are distinguished by reference numerals, the master machine is referred to by the game apparatus 1a, and the slave machine is referred to by the game apparatus 1b or 1c. In this case, their components are also denoted by reference numerals using "a", "b", or "c".

FIG. 3 is used for describing how the game progresses when the game apparatus 1 in the state where synchronization is established by a synchronization process, which will be described later, repeatedly performs a process of one cycle (one frame) which corresponds to a time period during which one game image is displayed on the LCD 21. In one frame, the master game apparatus 1a transmits game data (master game data) to each of the slave game apparatuses 1b and 1c, and each of the game apparatuses 1b and 1c transmits game data (slave game data) in replay to the game apparatus 1a. Due to exchange of the game data, the game is allowed to progress in the state where processes in the game apparatuses 1a-1c are in synchronization with each other. Here, depending on the contents of the game, the game data may contain key data (data related to an operation of the operating switch 22) or game parameters for each game apparatus 1. In the present embodiment, a synchronization OK flag which will be described later is further added to the slave game data. Also, the game data is transmitted based on a transmission frame defined by radio communication and used in the game system, and the detailed descriptions thereof are omitted herein.

In FIG. 4, one frame is divided into a display period and a blanking period. For example, the V_COUNT register 131 counts, as one cycle, a time period in which the V_COUNT value shifts from 0 to 262, and the time period in which the V_COUNT value shifts from 0 to 262 is defined as one frame. In the case as shown in FIG. 4 where the resolution of the display screen of the LCD 21 is 256×192 dots, and one scanning line corresponds to dots in a horizontal direction in the figure, the display period corresponds to a time period in which the V_COUNT value shifts from 0 to 191. In the display period in which the V_COUNT value shifts from 0 to 191, the display screen of the LCD 21 is changed for each scanning line by the LCD controller 13 in accordance with the contents of the VRAM 15. The blanking period corresponds to a time period in which the V_COUNT value shifts from 192 to 262. The contents of the VRAM 15 are changed in the blanking period, so that game images are displayed and changed on the LCD 21 without being corrupted. In the present embodiment, a time period required for scanning one scanning line is Lt, and a time period required for scanning one frame is Ft. For example, the game apparatus 1 draws 60 frames per second. In this case, the time period required for scanning one frame Ft is nearly equal to 16.67 milliseconds (ms), and the time period required for scanning one scanning line Lt is nearly equal to 63.37 μs.

Referring to FIG. 5, described next is the outline of the procedure of establishing synchronization after the master game apparatus 1a and the slave game apparatus 1b (hereinafter, they are interchangeably referred to as a "master machine" and a "slave machine", respectively) are connected with each other.

After the connection between the master machine and the slave machine is established, the master machine acquires its own V_TSF value. The V_TSF value is a TSF value indicated by the TSF register 33 when a V_COUNT value indicated by the V_COUNT register 131 is 0. In the following descriptions, the V_TSF value of the master machine is referred to as a "master V_TSF value", and the V_TSF value of the slave machine is referred to as a "slave V_TSF value". The details of a method of acquiring the values will be described later.

Next, the master machine transmits a beacon to the slave machine. The beacon is a packet which is broadcast by the master machine to all slave machines in a wireless network at regular intervals (e.g., 500 ms intervals) in order to bring all game apparatuses 1 in the network into synchronization with respect to timing of data transmission. In the present embodiment, the master machine transmits to the slave machines the packet which describes the acquired master V_TSF value and the master TSF value which corresponds to the value of the TSF register 33 of the master machine at a beacon transmission time.

Each slave machine receives the beacon from the master machine, and sets the TSF value thereof (i.e., the slave TSF value) so as to agree with the master TSF value described in the beacon. Then, the slave machine checks synchronism with the master machine at interrupt time k1 to correct asynchrony thereof (e.g., a time point which is set in the blanking period and at which the V_COUNT value is 212). Specifically, the slave machine acquires the slave V_TSF value thereof at the time k1, and detects asynchrony with the master machine based on difference A1 between the master V_TSF value described in the beacon and the slave V_TSF value. That is, the slave machine uses the master V_TSF value described in the beacon to detect asynchrony with the master machine with respect to a frame cycle.

Then, in order to reduce the difference A1 corresponding to asynchrony with the master machine, the slave machine lengthens the frame cycle thereof by a time period of j1 which is less than or equal to the difference A1. Specifically, the slave machine sets the time period of j1 in terms of the number of scanning lines (e.g., a natural number less than or equal to 10). Then, the slave machine decreases the V_COUNT value indicated by its own V_COUNT register 131 by the number of scanning lines, thereby lengthening the frame cycle thereof. Here, the maximum number of scanning lines by which the frame cycle is lengthened in one adjustment by the slave machine may be set so as to be a maximum possible numerical value depending on hardware configuration. For example, in the case of the frame configuration illustrated in FIG. 4, in order to decrease the V_COUNT value in the blanking period, it is theoretically possible to decrease the V_COUNT value from 262 to 192 (i.e., the number of scanning lines to be adjusted is 70). However, in the present embodiment, the V_COUNT value of 212 is decreased by a value less than or equal to 10 in one adjustment.

Next, at the next asynchrony correction interrupt time k2 (i.e., the next time point at which the V_COUNT value is 212), the slave machine checks whether synchronization with the master machine has been established by the previous adjustment. If there is still asynchrony with the master machine, then the slave machine lengthens the frame cycle thereof by a time period of j2 which is less than or equal to the difference A1. Specifically, the slave machine also sets the time period of j2 in terms of the number of scanning lines (e.g., a natural number less than or equal to 10). Then, the slave machine decreases the V_COUNT value indicated by its own V_COUNT register 131 by the number of scanning lines, thereby lengthening the frame cycle thereof. Such adjustment is repeated until asynchrony with the master machine becomes zero, thereby establishing synchronization between the slave machine and the master machine.

On the other hand, the master machine lengthens the frame cycle thereof by a time period of i at regular intervals of h1. Specifically, the slave machine sets the time period of i in terms of the number of scanning lines (e.g., 1). Then, the master machine decreases the V_COUNT value indicated by its own V_COUNT register 131 by the number of scanning lines, thereby lengthening the frame cycle thereof. This frame cycle adjustment of the master machine is intended to accommodate individual differences in operating clock between game apparatuses 1 included in the game system, and the time h1 at which the master machine adjusts the frame cycle thereof and the number i of lines to be adjusted are set depending on assumed individual differences. The details of setting will be described later.

Thereafter, when a time for regularly repeated beacon transmission arrives, the master machine acquires a new master V_TSF value. Then, the master machine describes in a beacon packet the new master V_TSF value and the current TSF value (i.e., the master TSF value), and transmits the beacon packet to the slave machine.

The slave machine receives the beacon packet from the master machine, and sets the TSF value thereof (i.e., the slave TSF value) so as to agree with the master TSF value described in the beacon packet. Then, the slave machine checks synchronism with the master machine at an interrupt time to correct asynchrony thereof, and establishes synchronization with the master machine in a manner as described above. Although the frame cycle of the master machine has been adjusted at the time h1 so as to be lengthened by the number i of lines to be adjusted, the slave machine establishes synchronization with the master machine in the adjusted frame cycle.

For example, consider a case where an operating clock frequency of the slave machine is slightly higher than an operating clock frequency of the master machine (i.e., the frame cycle of the slave machine is shorter). In this case, as described above, the slave machine adjusts the frame cycle thereof so as to be lengthened, thereby readily establishing synchronization with the master machine. On the contrary, in the case where the operating clock frequency of the master machine is slightly higher than the operating clock frequency of the slaver machine (i.e., the frame cycle of the master machine is shorter), if the master machine does not adjust the frame cycle thereof, the slave machine is required to adjust the frame cycle thereof so as to be shortened to establish synchronization with the master machine. As a result, the time for the slave machine to carry out processing might not be secured in an adjusted frame. Here, the time h1 at which the master machine adjusts the frame cycle and the number i of lines to be adjusted are set based on an individual difference of a maximum possible value. That is, the time h1 and the number i of lines to be adjusted are set with consideration of the individual difference, such that the frame cycle of the master machine does not precede the frame cycle of the slave machine. Thus, it is possible for the slave machine to adjust the frame cycle thereof so as to be lengthened as described above, thereby readily establishing synchronization with the master machine. That is, in adjustment of the frame cycle of either the master machine or the slave machine, the frame cycle thereof is always adjusted so as to be lengthened to establish synchronization with the other, and therefore it is possible to secure the processing time therefor within a frame in the adjusted cycle.

As such, in the game system including a plurality of game apparatuses, the slave machine lengthens the frame cycle thereof by a time period of j1 at the time k1 and by a time period of j2 at the time k2, thereby performing a synchronization process with the master machine. Also, the master machine carries out a process of lengthening the frame cycle thereof by a time period of i at the time h1 to deliberately cause the frame cycle to tend to be slower than the frame cycle of the slave machine, thereby causing the slave machine to adjust the frame cycle thereof so as to be lengthened by a time period of j3 at time k3. Accordingly, it is possible to secure a minimum length of a process cycle with consideration of individual differences between the game apparatuses, and to stably carry out synchronization adjustment.

Figure 6:
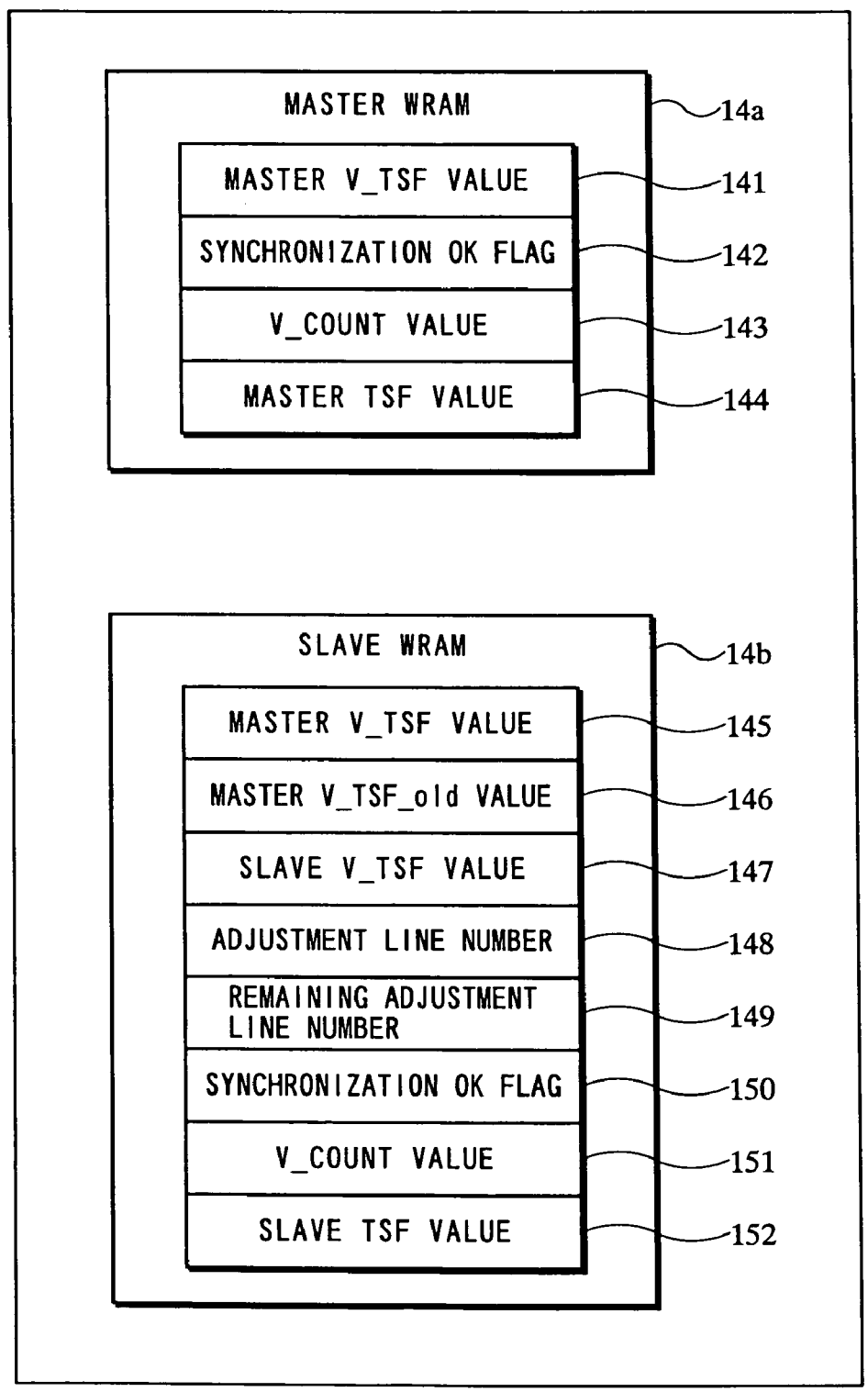
FIG. 6 is a table showing examples of data stored in a WRAM 14 shown in FIG. 2.

FIG. 6 is a table showing examples of data stored in the WRAM 14 for establishing synchronization in a manner as described above. Note that in FIG. 6, the master and slave machines 1a and 1b are distinguished by WRAMs 14a and 14b, respectively.

In FIG. 6, the WRAM 14a of the master machine has stored therein a master V_TSF value 141, a synchronization OK flag 142, a V_COUNT value 143, and a master TSF value 144. The master V_TSF value 141 is acquired by a CPU core 11a of the master machine calculating, as necessary, a TSF value when the V_COUNT value of the master machine is 0, and the acquired value is stored into the WRAM 14a. The synchronization OK flag 142 is transmitted from the slave machine together with game data attached therewith, and stored into the WRAM 14a so as to be associated with the slave machine with which the master machine has established connection. A CPU core 11a reads, as the V_COUNT value 143, a numerical value counted by a V_COUNT register 131a of the master machine, and the read value is updated based on the read value and stored into the WRAM 14a. The CPU core 11a reads, as the master TSF value 144, a numerical value counted by a TSF register 33a of the master machine, and the master TSF value 144 is updated based on the read value and stored into the WRAM 14a.

The WRAM 14b of the slave machine has stored therein a master V_TSF value 145, a master V_TSF_old value 146, a slave V_TSF value 147, an adjustment line number 148, a remaining adjustment line number 149, a synchronization OK flag 150, a V_COUNT value 151, and a slave TSF value 152. The master V_TSF value 145 is transmitted together with a beacon attached therewith from the master machine at regular intervals, and stored into the WRAM 14b. Then, the master V_TSF value 145 is stored as the master V_TSF_old value 146 into the WRAM 14b based on a predetermined update requirement. The slave V_TSF value 147 is acquired by the CPU core 11b of the slave machine calculating, as necessary, a TSF value when the V_COUNT value of the slave machine is 0, and the acquired value is stored into the WRAM 14b. The adjustment line number 148 and the remaining adjustment line number 149 are calculated by the slave machine at an asynchrony correction interrupt time. A value "1" is substituted into the synchronization OK flag 150 if a difference between the master V_TSF value 145 and the slave V_TSF value 147 is within a predetermined range, while a value "0" is substituted if the difference is out of the predetermined range. The CPU core 11b reads a numerical value counted by a V_COUNT register 131b of the slave machine, and the V_COUNT value 151 is updated based on the read value and stored into the WRAM 14b. The CPU core 11b reads a numerical value counted by a TSF register 33b of the slave machine, and the slave TSF value 152 is updated based on the read value and stored into the WRAM 14b.

Figure 7:
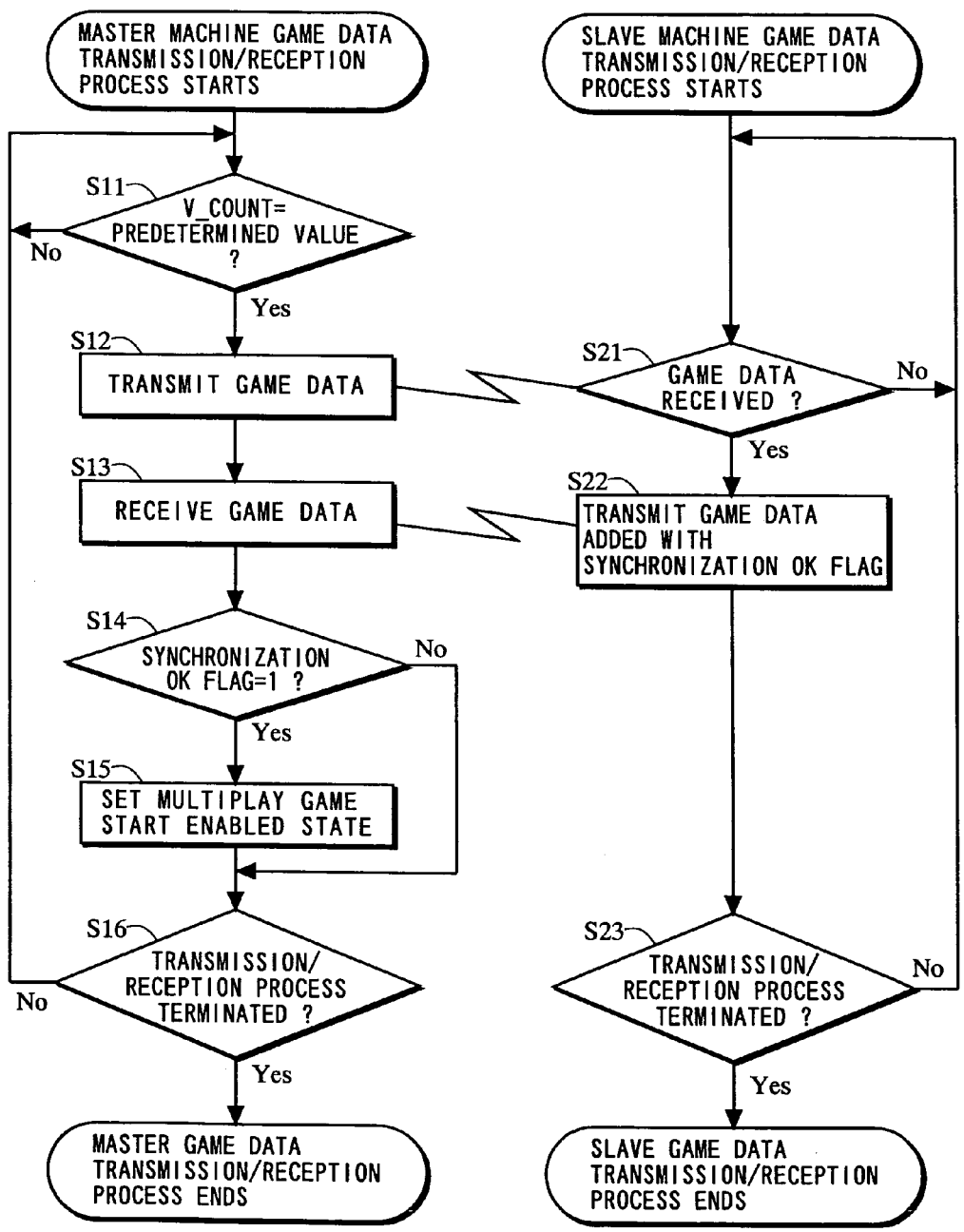
FIG. 7 is a flowchart showing operations of master and slave game apparatuses 1 which carry out a game data transmission/reception process.

Next, referring to FIG. 7, a game data transmission/reception process is described. FIG. 7 is a flowchart showing operations of the master machine and the slave machine which carry out the game data transmission/reception process. Note that the game data transmission/reception process is a process where one frame corresponds to one cycle, and game data is transmitted from the master machine to the slave machine and returned from the slave machine to the master machine within one frame (see FIG. 3).

In FIG. 7, the master machine waits for the V_COUNT value thereof to reach a predetermined value (step S11). In step S11, it is determined whether there has occurred a hardware interrupt which is set so as to occur when the V_COUNT reaches the predetermined value. Alternatively, the CPU core 11a may carry out the determination by reading a V_COUNT value counted by the V_COUNT register 131a of the master machine and by comparing the V_COUNT value with a predetermined value (e.g., 10). Then, if the V_COUNT value reaches the predetermined value, the CPU core 11a transmits game data to the slave machine (step S12).

On the other hand, the slave machine waits for the game data transmitted from the master machine to be received (step S21). Then, if the slave machine receives the game data from the master machine, the slave machine adds the synchronization OK flag 150, which is stored in the WRAM 14b thereof, to the received game data, and transmits the game data to the master machine (step S22). The processes of steps S21 and S22 are repeated until the slave machine terminates the transmission/reception process (step S23).

The master machine receives the game data which has been transmitted from the slave machine in step S22 (step S13), and determines whether the synchronization OK flag added to the received game data is "1" (step S14). Then, if the synchronization OK flag is "1", the master machine determines that it is possible to play a multiplayer game with the slave machine having transmitted the synchronization OK flag, and sets the master machine itself into a multiplayer game start enabled state where the multiplayer game with the slave machine can be started (step S15). Thereafter, the procedure proceeds to the next step S16. If the master machine is set into the multiplayer game start enabled state, the master machine starts the multiplayer game with the slave machine having transmitted the synchronization OK flag indicative of "1". On the other hand, if the synchronization OK flag is "0", the master machine determines that it is not possible to play the multiplayer game with the slave machine which transmitted the synchronization OK flag, and the procedure proceeds to the next step S16. The processes of steps S11-S15 are repeated until the master machine terminates the transmission/reception process (step S16).

Figure 8:
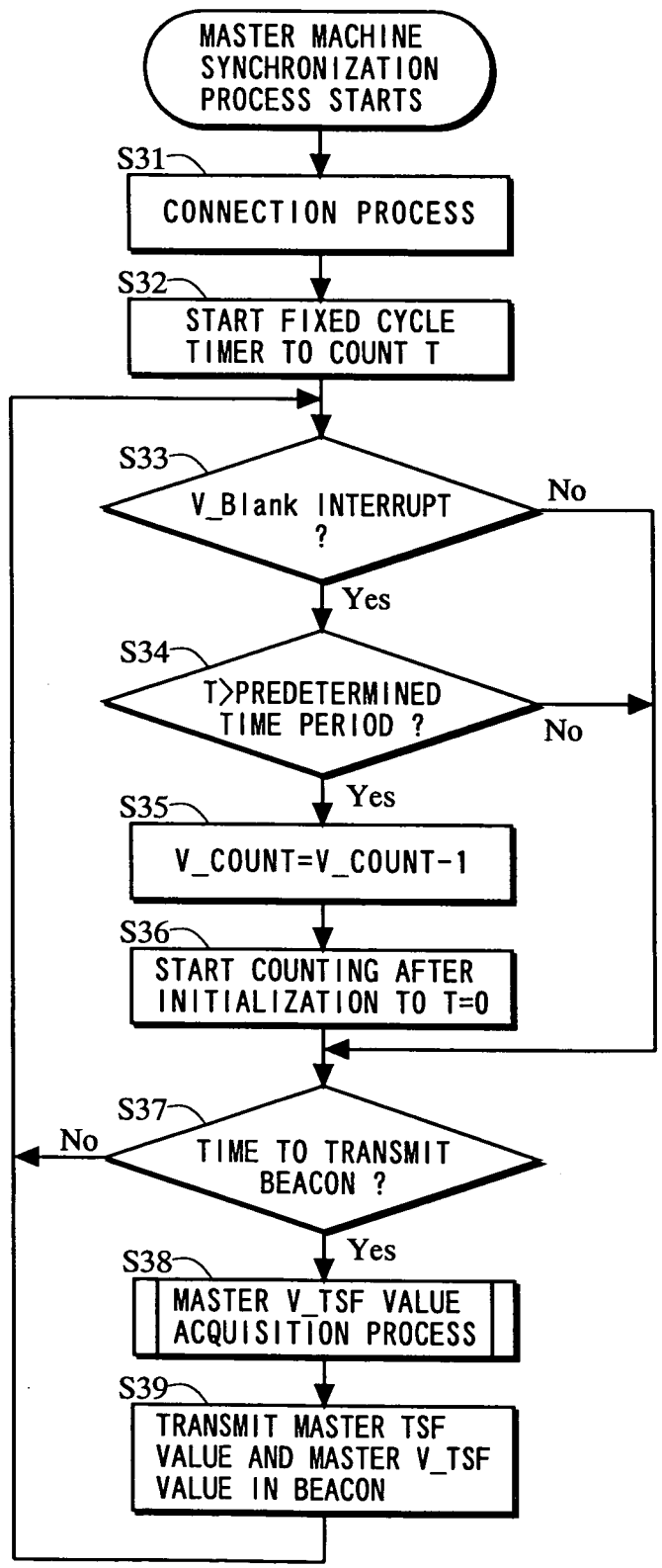
Figure 9:
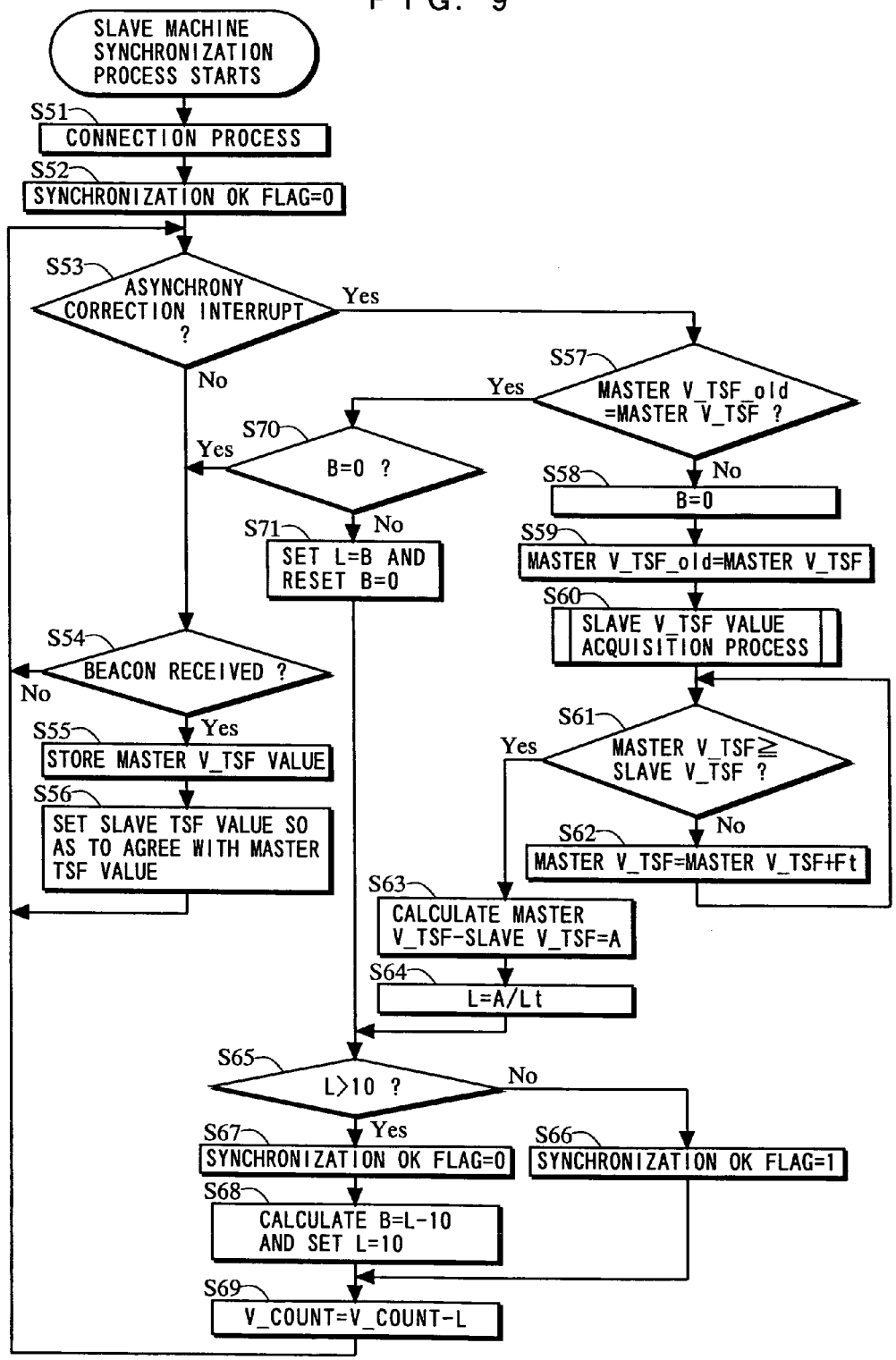
FIG. 9 is a flowchart showing a synchronization process performed by the slave game apparatus 1b.
Figure 10:
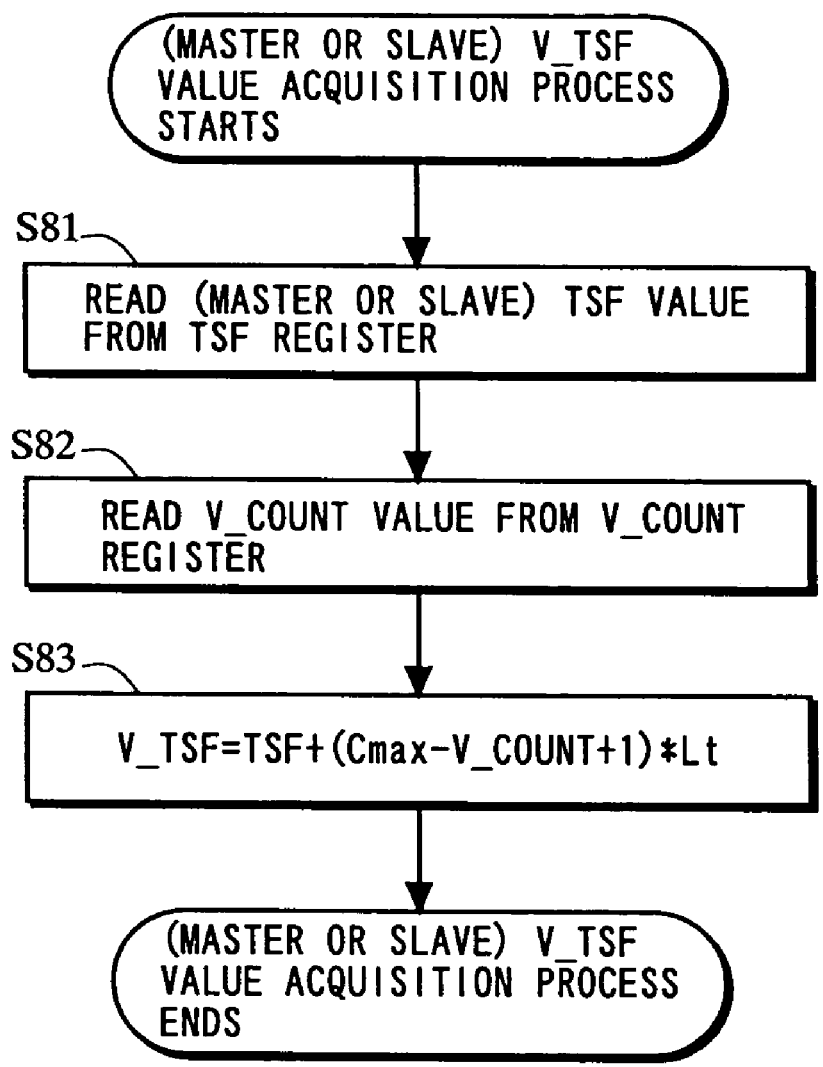
FIG. 10 is a subroutine showing a master V_TSF value acquisition process performed in step S38 of FIG. 8 and a slave V_TSF value acquisition process performed in step S60 of FIG. 9.

Next, referring to FIGS. 8-10, a process for establishing synchronization between the master machine and the slave machine is described. Note that FIG. 8 is a flowchart showing a synchronization process performed by the master game apparatus 1a, FIG. 9 is a flowchart showing a synchronization process performed by the slave game apparatus 1b, and FIG. 10 is a subroutine showing a master V_TSF value acquisition process performed in step S38 of FIG. 8 and a slave V_TSF value acquisition process performed in step S60 of FIG. 9.

Firstly, referring to FIG. 8, a process for the master machine to establish synchronization with the slave machine is described. In FIG. 8, the master machine carries out a connection process with the slave machine by radio communication, thereby establishing a connection with the slave machine (step S31), and then the master machine causes its own fixed cycle timer to start a count of T (step S32). Then, the CPU core 11a of the master machine determines whether it is the time for a V_Blank interrupt (step S33). The term "V_Blank interrupt" refers to a V_COUNT interrupt which occurs once per frame when the display period is shifted to the blanking period. For example, in the example shown in FIG. 4, if the V_COUNT value is 192, the CPU core 11a determines that it is the time for a V_Blank interrupt. If it is the time for the V_Blank interrupt, the CPU core 11a of the master machine determines whether the count of T by the fixed cycle timer is longer than a predetermined time period (step S34). Hereinbelow, a method for setting the predetermined time period for use in the determination of step S34 is described.

Here, consider a maximum width of individual difference (e.g., a design value tolerance) which is estimated for operating clocks of the game apparatuses 1 connected to the game system. The maximum width of individual difference in operating clock is assumed to be w parts per million (ppm). This indicates an individual difference that a given game apparatus 1 operates a million times while another game apparatus 1 operates a million and w times. In two game apparatuses 1 having an individual difference in operating clock therebetween which is w ppm, the number n of frames displayed before their process times are shifted by one scanning line is calculated as follows:

$$n = (1000000/w) * \{1/(C\text{max}+1)\},$$

where Cmax is a maximum value of the V_COUNT value counted by the V_COUNT register 131 (262 in the example of FIG. 4). The predetermined time period used in the determination in step S34 is set based on the number n of frames or a time period corresponding to the number n of frames. For example, if the individual difference is ±30 ppm (maximum width w=60) and Cmax=262, the number of frames n is nearly equal to 63. In this manner, the predetermined time period used for the determination in step S34 is previously set based on the individual difference in operating clock estimated for the game apparatuses 1 and the maximum value of the V_COUNT value.

Referring back to FIG. 8, if the count of T by the fixed timer is longer than the predetermined time period, the CPU core 11a of the master machine updates the V_COUNT value by subtracting 1 therefrom (step S35). This updating in step S35 corresponds to a process for lengthening the frame cycle by a time period of i at the time h1 in FIG. 5. Specifically, the master machine repeats step S35 at intervals of the predetermined time period, thereby adjusting the frame cycle thereof so as to be lengthened by one scanning line. As such, the V_COUNT value is adjusted during the blanking period, and the adjusted V_COUNT value is updated so as to correspond to a V_COUNT value in the blanking period, whereby the master machine is able to adjust the frame cycle without corrupting any game image displayed on the LCD 21a. Then, the CPU core 11a of the master machine initializes the count of T by the fixed timer of the master machine, and causes the fixed timer to start counting (step S36). Thereafter, the procedure proceeds to the next step S37. If it is not the time for a V_Blank interrupt, or if the count of T by the fixed cycle timer is less than or equal to the predetermined time period, the CPU core 11a of the master machine proceeds to the next step S37.

In step S37, the CPU core 11a of the master machine determines whether it is the time to transmit a beacon to the slave machine. If it is the time to transmit the beacon, then the CPU core 11a of the master machine acquires a master V_TSF value (step S38). Then, the CPU core 11a of the master machine transmits the TSF value thereof (i.e., the master TSF value) and the master V_TSF value acquired in step S38 in the beacon to the slave machine (step S39). Thereafter, the procedure returns to step S33 for repeating the process therefrom. On the other hand, if it is determined in step S37 not to be the time to transmit the beacon, the CPU core 11a of the master machine returns to step S33 for repeating the process therefrom. Hereinafter, referring to FIG. 10, a master V_TSF value acquisition process is described in detail below. Note that a process for the master machine to acquire the V_TSF value thereof and a process for the slave machine to acquired the V_TSF value thereof are distinguishedly referred to as a "master V_TSF value acquisition process", and a "slave V_TSF value acquisition process", respectively. However, the processes for acquiring the V_TSF values are identical to each other, and therefore generically described below without specifying the master or slave machine or the slave machine.

In FIG. 10, the CPU core 11 reads a TSF value counted by the TSF register 33 of the game apparatus, and stores the read value into the WRAM 14 (step S81). Next, the CPU core 11 reads a V_COUNT value counted by the V_COUNT register 131 of the game apparatus, and stores the read value into the WRAM 14 (step S82). Then, the CPU core 11 uses the TSF value acquired in step S81 and the V_COUNT value acquired in step S82 to calculate the V_TSF value of the game apparatus in the following mathematical expression (step S83):

$$V\_TSF = TSF + (C\text{max} - V\_COUNT + 1) * Lt,$$

where Cmax is a maximum value of the V_COUNT value counted by the V_COUNT register 131 (262 in the example of FIG. 4), and Lt is a time period required for scanning one scanning line. With this mathematical expression, it is possible to calculate, as the V_TSF value of the game apparatus, a TSF value indicated by the TSF register 33 the next time the V_COUNT register 131 resets the V_COUNT value to zero.

Next, referring to FIG. 9, a process for the slave machine to establish synchronization with and the master machine is described. In FIG. 9, the slave machine carries out a connection process with the master machine by radio communication, thereby establishing a connection with the master machine (step S51), and the slave machine resets the synchronization OK flag thereof to "0" (step S52). Then, the CPU core 11b of the slave machine determines whether it is the time for asynchrony correction interrupt (step S53). The term "asynchrony correction interrupt" refers to a V_COUNT interrupt which occurs once per frame in the blanking period in order for the slave machine to be in synchronization with the master machine. For example, in the example shown in FIG. 4, if the V_COUNT value is 212, the CPU core 11b determines that it is the time for asynchrony correction interrupt. Note that after the V_COUNT value has been adjusted as described below, the next time the V_COUNT value indicates 212 in the same frame, the CPU core 11b of the slave machine determines that it is not the time for asynchrony correction interrupt.

If it is not the time for asynchrony correction interrupt, the CPU core 11b of the slave machine determines whether any beacon packet from the master machine has been received (step S54). Next, if any beacon packet has been received, the CPU core 11b of the slave machine stores a master V_TSF value described in the beacon packet as a master V_TSF value 145 of the WRAM 14b (step S55). Then, the CPU core 11b of the slave machine sets the TSF value of the slave machine (the slave TSF value) so as to agree with the master TSF value described in the beacon packet (step S56), and returns to step S53 for repeating the process therefrom. On the other hand, if no beacon packet has been received, the CPU core 11b of the slave machine returns to step S53 for repeating the process therefrom.

If it is determined in step S53 that it is the time for asynchrony correction interrupt, the CPU core 11b of the slave machine determines whether the master V_TSF value 145 stored in the WRAM 14b and the master V_TSF_old value 146 are equal to each other (step S57). As will become apparent later, if the slave machine receives the beacon packet from the master machine so that the master V_TSF value 145 stored in the WRAM 14b is updated, the master V_TSF value 145 and the master V_TSF_old value 146 become different from each other (i.e., NO in step S57).

If the master V_TSF value 145 and the master V_TSF_old value 146 differ from each other, the CPU core 11b of the slave machine sets the remaining adjustment line number B so as to be zero (step S58), updates the master V_TSF_old value 146 stored in the WRAM 14b so as to agree with the master V_TSF value 145 (step S59), and acquires the slave V_TSF value (step S60). A process of acquiring the slave V_TSF value is similar to the subroutine shown in FIG. 10, and therefore the derailed descriptions thereof are not described here.

Next, the CPU core 11b of the slave machine compares the master V_TSF value stored in the WRAM 14b with the slave V_TSF value acquired in step S60 to determine whether the master V_TSF value is equal to or more than the slave V_TSF value (step S61). Then, if the master V_TSF value is less than the slave V_TSF value, the CPU core 11b adds to the master V_TSF value a value corresponding to a time period Ft required for scanning one frame, thereby updating the master V_TSF value anew (step S62). Step S62 is repeated until the updated master V_TSF value becomes equal to or more than the slave V_TSF value. On the other hand, if the master V_TSF value is equal to or more than the slave V_TSF value, the CPU core 11b calculates difference A by subtracting the slave V_TSF value from the master V_TSF value (step S63). A process of calculating difference A in steps S61-S63 corresponds to the process of calculating difference A1 at the time k1 shown in FIG. 5. This process is performed in order to prevent an assumed case where a cycle of a process for acquiring the master V-TSF value by the master machine and a cycle of a process for asynchrony correction by the slave machine are out of phase from each other by an integral multiple of Ft. Then, the CPU core 11b calculates the adjustment line number L (step S64). The CPU core 11b calculates the adjustment line number L such as L=A/Lt, and a resultant value is stored into the WRAM 14b. Here, Lt is a time period required for scanning one scanning line. Note that if the adjustment line number L is not an integer, the fractional portion thereof is dropped. Step S64 obtains asynchrony between the slave machine and the master machine as the number L of lines in terms of a time period required for scanning one scanning line.

Next, the CPU core 11b determines whether the adjustment line number L stored in the WRAM 14b is greater than 10 (step S65). If L≦10, then the CPU core 11b sets the synchronization OK flag so as to be "1" (step S66), and the procedure proceeds to the next step S69. Specifically, if the adjustment line number is less than or equal to 10, the slave machine determines that synchronization with the master machine is established by adjusting the V_COUNT value as described below. On the other hand, if L>10, then the CPU core 11b sets the synchronization OK flag so as to be "0" (step S67). Then, the CPU core 11b sets, as a remaining adjustment line number B, a value obtained by subtracting 10 from the adjustment line number L, and sets the adjustment line number L so as to be 10. These values are stored into the WRAM 14b (step S68), and the procedure proceeds to the next step S69.

In step S69, the CPU core 11b of the slave machine updates the V_COUNT value of the slave machine by subtracting the adjustment line number L from the V_COUNT value, and the procedure returns to step S53. This updating in step S69 corresponds to the process of lengthening frame cycles at the times k1, k2, and k3 by the time period j1, j2, and j3, respectively, as shown in FIG. 5.

On the other hand, if it is determined in step S57 that the master V_TSF value 145 and the master V_TSF_old value 146 are equivalent to each other, the CPU core 11b of the slave machine determines whether the currently set remaining adjustment line number B is 0 (step S70). Then, if the remaining adjustment line number B is not 0, the CPU core 11b sets the adjustment line number L so as to agree with the remaining adjustment line number B. Thereafter, the remaining adjustment line number is reset such that B=0. The settings are stored into the WRAM 14b (step S71), and the procedure proceeds to step S65. On the other hand, if the remaining adjustment line number B is 0, the CPU core 11b proceeds to step S54.

Here, in a series of processes in steps S65-S71, a maximum number of scanning lines by which the frame cycle is lengthened in one adjustment by the slave machine is exemplarily set so as to be 10. Specifically, the slave machine adjusts the frame cycle so as to be lengthened by up to a maximum value of the scanning line number, i.e., 10. In the next frame, the number of remaining scanning lines required to be adjusted is used as the remaining adjustment line number B for adjusting the frame cycle. The maximum value of the scanning line number may be set so as to be a numerical value which can be realized depending on hardware configuration. For example, in the case of the frame configuration illustrated in FIG. 4, in order to adjust the V_COUNT value in the blanking period, it is theoretically possible to adjust the V_COUNT value from 262 to 192 (the maximum value 70). In this manner, the V_COUNT value is adjusted in the blanking period, and the adjusted V_COUNT value is updated so as to agree with any V_COUNT value in the blanking period, thereby allowing the slave machine to adjust the frame cycle without corrupting a game image displayed on the LCD 21a.

As such, in a game system according to an embodiment of the illustrative embodiments, a game apparatus, which is set as a slave machine, performs a synchronization process by lengthening the frame cycle thereof, and therefore it is possible to secure a sufficient time period for processing in each frame cycle, while establishing synchronization in processing with the master game apparatus. Also, the master game apparatus carries out a process of deliberately causing the frame cycle thereof to tend to be slower than the frame cycle of the slave machine, thereby causing the slave machine to adjust its own frame cycle so as to be lengthened. Accordingly, it is possible to secure a minimum length of a process cycle with consideration of individual differences between the game apparatuses, and to stably carry out synchronization adjustment. Also, in the synchronization adjustment by individual game apparatuses, use of a counter function for use in updating a game image display makes it possible to efficiently establish synchronization. Also, synchronization makes it possible to predict the time of data transmission/reception, making it possible to carry out a game process at a processing time as in a game which does not require communication between game apparatuses. Accordingly, game programming can be simplified. Moreover, in the individual apparatuses, synchronization adjustments are performed during the blanking period, and an adjusted count value is updated so as to agree with a count value in the blanking period, thereby making it possible to secure synchronization in processing between the game apparatuses without corrupting screen display images of the game apparatuses.

As clocking means for establishing synchronization in, for example, a process for exchanging data between a plurality of game apparatuses 1, the game system according to the present embodiment uses a timing synchronization function for use in radio communication and in conformity with wireless LAN IEEE 802.11 standards, though any clocking means can be used. For example, the game apparatuses may receive time information transmitted from a satellite so as to bring their clocking means into synchronization with each other. Also, a network time protocol (NTP) may be used for establishing synchronization between the clocking means of the game apparatuses. An effect similar to that achieved by the present invention can be achieved by using clock means of another type in accordance with specifications of radio or wired communication between the game apparatuses 1.

Although the above embodiment has been described with respect to a case where a game cartridge is used as a storage medium having stored therein information such as a game program, a storage medium of any form may be used for storing the game program of the present invention. For example, in the case where the game program of the present invention is processed by a non-portable game apparatus, the game program may be stored in an optical medium or the like and read therefrom for similar processing. Also, the game program may be supplied through another medium or a communication line.

While the invention has been described in detail, the foregoing description is in all aspects illustrative and not restrictive. It is understood that numerous other modifications and variations can be devised without departing from the scope of the invention.

What is claimed is:

1. A game system comprising first and second game apparatuses which carry out a game process for each predefined process cycle of a predetermined length, the first and second game apparatuses communicating with each other in a multiplayer game play,
wherein the first game apparatus includes:
a first timer;
a first timing information acquisition section which acquires first timing information, which indicates a timer value of the first timer at a predetermined reference time in a process cycle of the first game apparatus, said timer value of the first timer corresponding to a count value of a first counter within a predetermined range,
said count value of the first counter representing timing to start each of repetitive processes of the game in the first game apparatus, and
a first timing information transmission control section which transmits the first timing information to the second game apparatus, and
wherein the second game apparatus includes:
a second timer;
a first timing information reception control section which receives the first timing information from the first game apparatus;
a second timing information acquisition section which acquires second timing information, which indicates a timer value of the second timer at a predetermined reference time in a process cycle of the second game apparatus, said timer value of the second timer corresponding to a count value of a second counter within a predetermined range said count value of the second counter representing timing to start each of repetitive processes of the game in the second game apparatus,
a detection section which detects a difference between the predetermined reference time of the second game apparatus and the predetermined reference time of the first game apparatus, based on the second timing information and the first timing information received by the first timing information reception control section; and
a first cycle change section which temporarily lengthens the process cycle of the second game apparatus if the difference detected by the detection section is equal to or more than a predetermined value, to cause a length of the process cycle of the second game apparatus to correspond more closely to a length of the process cycle of the first game apparatus, wherein
each of the first and second game apparatuses further includes a display control section which designates a display position based on the count value of the first or second counter, respectively, and updates a screen display corresponding to the display position.

2. The game system according to claim 1, wherein if a timer value of the first timer at the first time is earlier than a timer value of the second timer at the second time, the detection section adds a predetermined length of the process cycle to the timer value of the first timer until the timer value of the first timer becomes later than the timer value of the second timer, and thereafter the detection section detects a difference between the timer value of the first timer and the timer value of the second timer as the difference between the predetermined reference times.

3. The game system according to claim 1,
wherein in each of the first and second game apparatuses:
a first or second counter automatically updates a count value and counts values within a predetermined range; said game system further comprising
a game process section which carries out a game process in rounds of values counted by the corresponding counter, each round corresponding to one predetermined process cycle, and
wherein the first cycle change section decreases the count value of the corresponding counter, thereby lengthening the process cycle of a respective first or second apparatus.

4. The game system according to claim 3,
wherein the predetermined process cycle is divided, based on the count value of the corresponding counter, into a display period in which the screen display is updated and a blanking period in which the screen display is not updated, and
wherein if the corresponding counter indicates a count value corresponding to the blanking period, the first cycle change section decreases the count value.

5. The game system according to claim 4, wherein the first cycle change section decreases the count value of the corresponding counter so as to remain indicative of the blanking period.

6. The game system according to claim 1,
wherein the first timing information acquisition section acquires the first timing information at regular intervals,
wherein upon acquisition of the first timing information, the first timing information transmission control section transmits the first timing information to the second game apparatus,
wherein upon reception of the first timing information, the second timing information acquisition section acquires the second timing information, and wherein upon acquisition of the second timing information, the detection section detects the difference between the predetermined reference time of the second game apparatus and the predetermined reference time of the first game apparatus based on the second timing information and the first timing information.

7. The game system according to claim 1,
wherein each of the first and second game apparatuses further includes:
   a clocking section which measures time and generates a clock value; and
   a clock synchronization section which establishes synchronization in the clock value with another game apparatus,
wherein the first timing information acquisition section acquires, as the first timing information, the clock value generated at the first time by the clocking section of the first game apparatus, and
wherein the second timing information acquisition section acquires, as the second timing information, the clock value generated at the second time by the clocking section of the second game apparatus.

8. The game system according to claim 1, wherein the first game apparatus further includes a second cycle change section which temporarily lengthens the process cycle of the first game apparatus with a predetermined timing.

9. The game system according to claim 8, wherein the predetermined timing, with which the second cycle change section temporarily lengthens the process cycle of the first game apparatus, is set based on an assumed individual difference in the process cycle between the first and second game apparatuses.

10. The game system according to claim 1, wherein the first timing information transmission control section broadcasts the first timing information.

11. The game system according to claim 1,
wherein the second game apparatus further includes a synchronization establishment information transmission control section which transmits synchronization establishment information to the first game apparatus, which indicates that synchronization with the first game apparatus has been established, if the difference detected by the detection section is less than a predetermined value, and
wherein the first game apparatus further includes:
   a synchronization establishment information reception control section which receives the synchronization establishment information transmitted from the second game apparatus; and
   a game process start section which, in response to the synchronization establishment information received by the synchronization establishment information reception control section, starts a multiplayer game process with the second game apparatus.

12. A first game apparatus for communicating with a second game apparatus for multiplayer game play, the first game apparatus and the second game apparatus carrying out a game process for each predetermined process cycle of a predetermined length, the second game apparatus transmitting first timing information which indicates a timer value of a first timer at a predetermined reference time in a process cycle of the second game apparatus, said timer value of the first timer corresponding to a count value of a first counter within a predetermined range,
   said count value of the first counter representing timing to start each of repetitive processes of the game in the second game apparatus,
wherein the first game apparatus includes:
   a first timing information reception control section which receives the first timing information from the second game apparatus;
   a second timing information acquisition section which acquires second timing information, which indicates a timer value of a second timer at a predetermined reference time in a process cycle of the first game apparatus, said timer value of the second timer corresponding to a count value of a second counter within a predetermined range,
   said count value of the second counter representing timing to start each of repetitive processes of the game in the first game apparatus
   a detection section which detects a difference between the predetermined reference time of the first game apparatus and the predetermined reference time of the second game apparatus, based on the second timing information and the first timing information received by the first timing information reception control section; and
   a cycle change section which temporarily lengthens the process cycle of the first game apparatus if the difference detected by the detection section is equal to or more than a predetermined value, to cause a length of the process cycle of the first game apparatus to correspond more closely to a length of the process cycle of the second game apparatus, wherein
each of the first and second game apparatuses further includes a display control section which designates a display position based on the count value of the first or second counter, respectively, and updates a screen display corresponding to the display position.

13. A first game apparatus for communicating with a second game apparatus for multiplayer game play, the first game apparatus and the second game apparatus carrying out a game process for each predetermined process cycle of a predetermined length,
wherein the first game apparatus includes:
   a timing information acquisition section which acquires timing information, which indicates a timer value of a first timer at a predetermined reference time in a first process cycle of the first game apparatus, said timer value of the first timer corresponding to a count value of a first counter within a predetermined range,
   said count value of the first counter representing timing to start each of repetitive processes of the game in the first game apparatus
   a timing information transmission control section which regularly transmits the timing information to the second game apparatus; and
   a cycle change section which temporarily lengthens the first process cycle of the first game apparatus with a predetermined timing, to cause a length of the process cycle of the first game apparatus to correspond more closely to a length of a process cycle of the second game apparatus, wherein
the first game apparatus further includes a display control section which designates a display position based on the count value of the first counter, and updates a screen display corresponding to the display position.

14. A non-transitory storage medium having stored therein a game program to be executed by a computer of a first game apparatus communicating with a second game apparatus for multiplayer game play, the first game apparatus and the second game apparatus carrying out a game process for each predetermined process cycle of a predetermined length, the second game apparatus transmitting first timing information which indicates a timer value of a first timer at a predetermined reference time in a process cycle of the second game apparatus, said timer value of the first timer corresponding to a count value of a first counter within a predetermined range, said count value of the first counter representing timing to start each of repetitive processes of the game in the second game apparatus wherein the game program causes the computer to function as:

a first timing information reception control section which receives the first timing information from the second game apparatus;

a second timing information acquisition section which acquires second timing information, which indicates a timer value of a second timer at a predetermined reference time in a process cycle of the first game apparatus, said timer value of the second timer corresponding to a count value of a second counter within a predetermined range, said count value of the second counter representing timing to start each of repetitive processes of the game in the first game apparatus a detection section which detects a difference between the predetermined reference time of the first game apparatus and the predetermined reference time of the second game apparatus, based on the second timing information and the first timing information received by the first timing information reception control section; and a cycle change section which temporarily lengthens the process cycle of the first game apparatus if the difference detected by the detection section is equal to or more than a predetermined value, to cause a length of the process cycle of the first game apparatus to correspond more closely to a length of the process cycle of the second game apparatus, wherein each of the first and second game apparatuses further includes a display control section which designates a display position based on the count value of the first or second counter, respectively, and updates a screen display corresponding to the display position.

15. A non-transitory storage medium having stored therein a game program to be executed by a computer of a first game apparatus for communicating with a second game apparatus for multiplayer game play, the first game apparatus and the second game apparatus carrying out a game process for each predetermined process cycle of a predetermined length, wherein the game program causes the computer to function as:

a timing information acquisition section which acquires timing information, which indicates a timer value of a first timer at a predetermined reference time in a process cycle of the first game apparatus, said timer value of the first timer corresponding to a count value of a first counter within a predetermined range said count value of the first counter representing timing to start each of repetitive processes of the game in the first game apparatus a timing information transmission control section which regularly transmits the timing information to the second game apparatus; and a cycle change section which temporarily lengthens the game apparatus process cycle of the first game apparatus with a predetermined timing, to cause a length of the process cycle of the first game apparatus to correspond more closely to a length of a process cycle of the second game apparatus, wherein the first game apparatus further includes a display control section which designates a display position based on the count value of the first counter, and updates a screen display corresponding to the display position.

16. A non-transitory storage medium having stored therein a game program to be executed by computers of a plurality of game apparatuses for communicating with each other for multiplayer game play, the plurality of game apparatuses each being set either as a master machine or as a slave machine and carrying out a game process for each predetermined process cycle of a predetermined length, wherein the game program causes a computer of a first game apparatus to function as a master/slave setting section which sets the game apparatus either as the master machine or as the slave machine based on a predetermined condition, wherein if the master/slave setting section sets the first game apparatus as the master machine, the game program causes the computer of the first game apparatus to function as:

a first timing information acquisition section which acquires first timing information, which indicates a timer value of a first timer at a predetermined reference time in a process cycle of the first game apparatus, said timer value of the first timer corresponding to a count value of a first counter within a predetermined range said count value of the first counter representing timing to start each of repetitive processes of the game in the first game apparatus a first timing information transmission control section which transmits the first timing information to a second game apparatus set as the slave machine; and a first cycle change section which temporarily lengthens the process cycle of the first game apparatus with a predetermined timing, and wherein if the master/slave setting section sets the first game apparatus as the slave machine, the game program causes the computer of the game apparatus to function as:

a first timing information reception control section which receives the first timing information from a second game apparatus being set as the master machine;

a second timing information acquisition section which acquires second timing information, which indicates a timer value of a second timer at a predetermined reference time in the process cycle of the first game apparatus, said timer value of the second timer corresponding to a count value of the first counter within a predetermined range said count value of the first counter representing timing to start each of repetitive processes of the game in the first game apparatus a detection section which detects a difference between the predetermined reference time of the first game apparatus and the predetermined reference time of the second game apparatus set as the master machine, based on the second timing information and the first timing information received by the first timing information reception control section; and a second cycle change section which temporarily lengthens the process cycle of the first game apparatus if the difference detected by the detection section is equal to or more than a predetermined value, to cause a length of the process cycle of the first game apparatus to correspond more closely to a length of the process cycle of the second game apparatus, the first game apparatus further includes a display control section which designates a display position based on the count value of the first counter, and updates a screen display corresponding to the display position.

\* \* \* \* \*